United States Patent [19]

Nukaya et al.

[11] Patent Number: 5,041,872

[45] Date of Patent: Aug. 20, 1991

[54] IMAGE FORMING APPARATUS USING A PHOTOSENSITIVE DRUM SELECTIVELY PIVOTING WITH AN UPPER PART OF THE HOUSING

[75] Inventors: Yasuyuki Nukaya, Tokyo; Hideo Aoki, Yokohama, both of Japan

[73] Assignee: Ricoh Company, Ltd., Tokyo, Japan

[21] Appl. No.: 403,709

[22] Filed: Sep. 6, 1989

[30] Foreign Application Priority Data

| | | | |
|---|---|---|---|
| Sep. 12, 1988 | [JP] | Japan | 63-119480[U] |
| Nov. 14, 1988 | [JP] | Japan | 63-285888[U] |
| Mar. 23, 1989 | [JP] | Japan | 1-69284[U] |
| May 18, 1989 | [JP] | Japan | 1-122863[U] |

[51] Int. Cl.[5] ........ G03G 15/00; G01D 15/06; H04N 1/23

[52] U.S. Cl. ........ 355/200; 346/160.1; 355/210; 358/300

[58] Field of Search ........ 355/200, 210, 211, 309; 358/300; 346/153.1, 160, 160.1, 108

[56] References Cited

U.S. PATENT DOCUMENTS

| | | | |
|---|---|---|---|
| 4,386,841 | 6/1983 | Wakao et al. | 355/200 |
| 4,575,221 | 3/1986 | Onoda et al. | 355/200 |
| 4,588,280 | 5/1986 | Ogawa et al. | 355/200 |
| 4,634,264 | 1/1987 | Takahashi | 355/200 |
| 4,642,661 | 2/1987 | Dean, II | 346/153.1 |
| 4,702,587 | 10/1987 | Miyoshi | 355/200 |
| 4,760,424 | 7/1988 | Ohba et al. | 355/296 X |
| 4,796,037 | 1/1989 | Takada et al. | 346/160.1 |
| 4,862,212 | 8/1989 | Tanzawa et al. | 355/296 X |
| 4,873,548 | 10/1989 | Kobayashi et al. | 355/200 |

FOREIGN PATENT DOCUMENTS

| | | | |
|---|---|---|---|
| 0127073 | 7/1984 | Japan | 355/211 |
| 0048067 | 4/1985 | Japan | 355/211 |
| 0095552 | 5/1985 | Japan | 355/309 |
| 0104958 | 6/1985 | Japan | 355/210 |
| 0140264 | 7/1985 | Japan | 355/210 |
| 0217371 | 10/1985 | Japan | 355/211 |
| 0238582 | 10/1987 | Japan | 355/245 |

*Primary Examiner*—A. T. Grimley
*Assistant Examiner*—Nestor R. Ramirez
*Attorney, Agent, or Firm*—Cooper & Dunham

[57] ABSTRACT

The photosensitive drum unit of an image forming apparatus is selectively coupled to the upper cover. The user can elect to have the drum unit pivot up with the upper cover or stay in the main housing independently of movement of the upper cover. The same operation that controls whether the drum unit moves with the upper cover can control whether a kit holder stays in place in the main housing or pivots up to make ii easier to change kit components such as a toner container.

18 Claims, 19 Drawing Sheets

IMAGE FORMING APPARATUS USING A PHOTOSENSITIVE DRUM SELECTIVELY PIVOTING WITH AN UPPER PART OF THE HOUSING

BACKGROUND OF THE INVENTION

The present invention generally relates to an image forming apparatus, and more particularly to an image forming apparatus which utilizes an electrophotographic process, such as a laser beam printer, a facsimile machine or a copier.

Currently, an image forming apparatus which utilizes an electrophotographic process, such as a laser beam printer, a facsimile machine or a copier is widely used. Generally, it is required that a user can certainly maintain an image forming apparatus with ease. For example, sometimes, a toner cartridge accommodated in the image forming apparatus must be replaced by a new toner cartridge. A paper jam must be removed with ease by the user. For these requirements, there have been proposed various arrangements of structural elements of an image forming apparatus.

For example, an electrophotographic image forming apparatus having a replaceable optical unit is proposed in U.S. patent application Ser. No. 213,778, the assignee of which is the same as the assignee of this application. However, the proposed electrophotographic image forming apparatus mainly relates to a replaceable optical unit and is not directed to an improvement on other structural elements such as a photosensitive drum and a toner cartridge in order to achieve easy and safety replacement operation.

SUMMARY OF THE INVENTION

Accordingly, a general object of the present invention is to provide a novel and useful image forming apparatus in which a photosensitive drum can be replaced by another one with ease.

A more specific object of the present invention is to provide an image forming apparatus which can enables easy and safety replacement operation for not only the photosensitive drum but also another replaceable unit such as toner cartridge.

The above objects of the present invention can be achieved by an image forming apparatus comprising a main housing of the image forming apparatus, an upper cover rotatably fastened to the main housing, the upper cover having a first position where the upper cover is closed to cover the main housing and a second position where the upper cover is rotated upward by a predetermined opening angle and is thus opened, a photosensitive drum accommodated in the main housing when the upper cover is held in the first position, optical image writing means accommodated in the main housing and positioned below the photosensitive drum, for optically writing an image on the photosensitive drum, image transferring means fastened to the upper cover and positioned above the photosensitive drum when the upper cover is held in the first position, for transferring the image formed on the photosensitive drum to a recording medium, and a drum unit supporting the photosensitive drum. The apparatus further comprises first means provided to the upper cover, for mechanically coupling the drum unit and the upper cover when the first means is activated, second means provided in the main housing, for mechanically coupling the drum unit and the main housing when the second means is activated, and third means provided in the main housing, for activating one of either the first means or the second means. The photosensitive drum supported by the drum unit moves together with the upper cover when the third means activates the first means, and the photosensitive drum is left in the main housing irrespective of the upper cover when the third means activates the second means.

The aforementioned objects of the present invention can also be achieved by an image forming apparatus comprising a main housing of the image forming apparatus, an upper cover rotatably fastened to the main housing, the upper cover having a first position where the upper cover is closed to cover the main housing and a second position where the upper cover is rotated upward by a predetermined opening angle and is thus opened, a photosensitive drum accommodated in the main housing when the upper cover is held in the first position, optical image writing means accommodated in the main housing and positioned below the photosensitive drum, for optically writing an image on the photosensitive drum, image transferring means fastened to the upper cover and positioned above the photosensitive drum when the upper cover is held in the first position, for transferring the image formed on the photosensitive drum to a recording medium, and a drum unit supporting the photosensitive drum. The apparatus further comprises first means provided to the upper cover, for mechanically coupling the drum unit and the upper cover when the first means is activated, second means provided in the main housing, for mechanically coupling the drum unit and the main housing when the second means is activated, and third means provided in the main housing, for activating one of either the first means or the second means, so that the photosensitive drum supported by the drum unit moves together with the upper cover when the third means activates the first means, and the photosensitive drum is left in the main housing irrespective of the upper cover when the third means activates the second means. Furthermore, the apparatus comprises a kit holder pivotally fastened to the main housing and accommodating a replaceable kit including a toner cartridge, the kit holder being coupled to and controlled by the third means and having an approximately horizontal position and a maintenance position where the kit holder is rotated upward by a predetermined angle.

Additional objects, features and advantages of the present invention will become apparent from the following detailed description when read in conjunction with the accompanying drawings.

DESCRIPTION OF THE PREFERRED EMBODIMENTS

Figure 1:
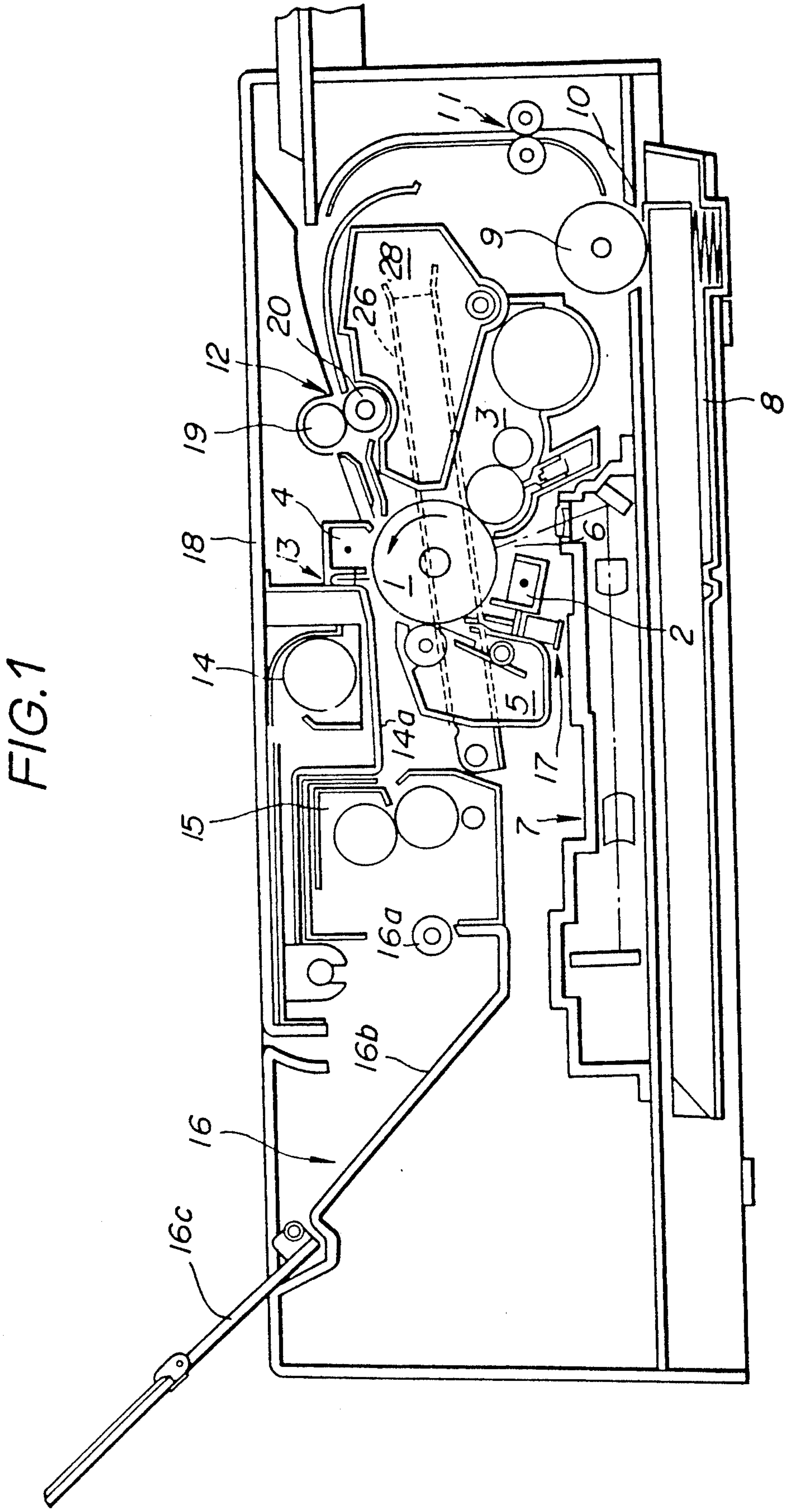
FIG. 1 is a side view illustrating the entire structure of a laser beam printer according to a preferred embodiment of the present invention.

A description is given of a laser beam printer according to a preferred embodiment of the present invention with reference to FIG. 1.

Referring to FIG. 1, a corona charger 2, a developing unit 3, an image transfer charger 4 and cleaning unit 5 are arranged along a photosensitive drum 1 in this order in the direction indicated by a arrow in which the photosensitive drum 1 rotates. An optical write unit 7 is provided so that a write light beam emitted therefrom passes through a space 6 formed between the corona charger 2 and the developing unit 3 and is irradiated onto the photosensitive drum 1. Thereby, the photosensitive drum 1 is exposed.

The space 6 and the corona charger 2 are located under the photosensitive drum 1. The optical write unit 7 is provided below the photosensitive drum 1, the developing unit 3 and the cleaning unit 5. The image transfer charger 4 is arranged above the photosensitive drum 1. A paper feed cassette 8 is provided below the optical write unit 7. A plurality of sheets of paper stacked in the paper feed cassette 8 are drawn therefrom one by one by a feed roller 9 and a corner claw 10. The drawn paper is transported upward by a pair of intermediate rollers 11 and a guide plate. Then the transported paper is fed to an image transfer part by a pair of register rollers 12 with a timing in which the position of the transported paper fits the position of an image formed on the photosensitive drum 1. A charge eliminating brush 13, an absorption fan 14, a fixing unit 15 and a paper ejection tray 16 are formed along a path through which paper having a transferred image passes.

An electrostatic latent image is formed on the photosensitive drum 1 by electrifying (charging) it by the corona charger 2 and by irradiating the optical write beam emitted from the optical write unit 7 thereon. The electrostatic latent image formed on the photosensitive drum 1 is developed by the developing unit 3 so that a corresponding toner image is formed on the photosensitive drum 1. The toner image is then transferred to the paper which is fed on the photosensitive drum 1 by the pair of register rollers 12 with the aforementioned timing. After transferring the toner image to the paper, the paper is detached from the photosensitive drum 1 by the charge eliminating brush 13. Then the paper is transported to the fixing unit 15 in a state where it is absorbed to a transport guide 14*a* due to an absorbing function of the absorption fan 14. The paper passes between an upper fixing roller 15' and a lower fixing roller 15" so that the transferred image is fixed on the paper. The paper leaving the fixing unit 15 is transported to the paper ejection tray 16 by a paper ejection roller 16*a*, and is guided by an inclined paper ejection guide 16*b*. Finally, the guided paper is stacked in the paper ejection tray 16.

On the other hand, after transferring image, toner particles left on the photosensitive drum 1 is removed therefrom by the cleaning unit 5. Then a charge left on the photosensitive drum 1 is eliminated by a charge eliminating unit 17. Thus, the photosensitive drum 1 is ready for the next image forming process.

An upper cover 18 of the laser beam printer is provided so that it can be opened upward and closed downward.

Figure 2:
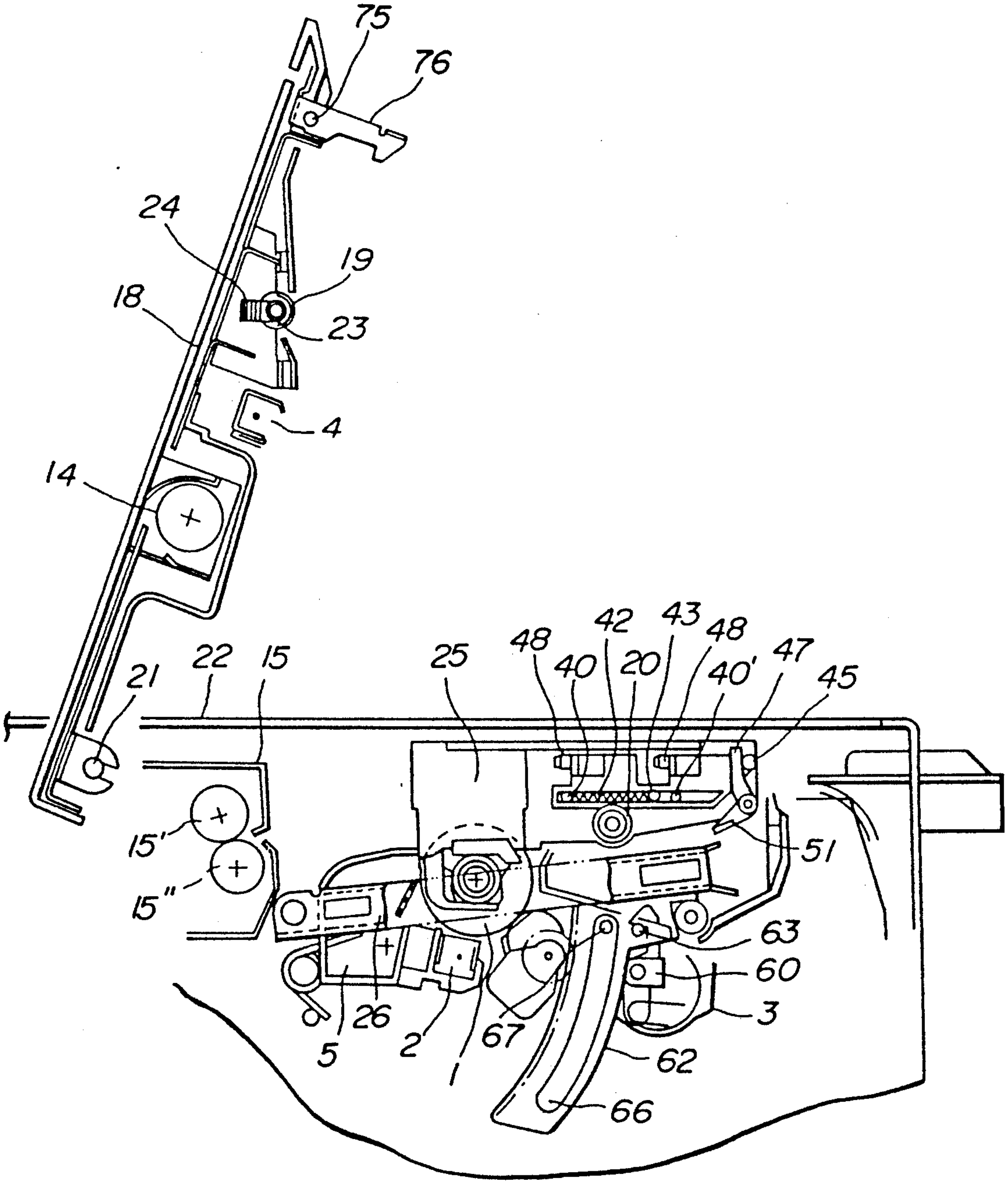
FIG. 2 is a side view partially illustrating the laser beam printer where only an upper cover is opened.

Referring to FIG. 2, the upper cover 18 is attached to a main housing 22 through a supporting shaft 21 so that it can move upward and downward. FIG. 2 shows the upper cover 18 which is open. The upper cover 18 is fixedly provided with the image transfer charger 4, the charge eliminating brush 13, the absorption fan 14 and the transport guide 14*a*. The upper register roller 19 of the pair of register rollers 12 is supported on a shaft receiving member (pillow) 23 which rotatably supports the register roller 19 and is fastened to the upper cover 18 due to the function of a spring 24 so that the upper register roller 19 moves together with the upper cover 18. When the upper cover 18 is opened, the paper transport path is exposed upward except the fixing unit 15. At the same time, it is possible to eliminate a pressure caused by the upper fixing roller 15' and the lower fixing roller 15" provided in the fixing unit 15. It is possible to design the upper fixing roller 15' to be held in the upper cover 18. The upper cover 18 is formed as a unit which has the image transfer charger 4 and the upper register roller 19.

In the state shown in FIG. 2 where the upper cover 18 is in the opening state, the photosensitive drum 1 is supported on the main housing 22. In this state, a drum unit 25 which supports the photosensitive drum 1 is held in the main housing 22, as shown in FIG. 2.

Figure 4:
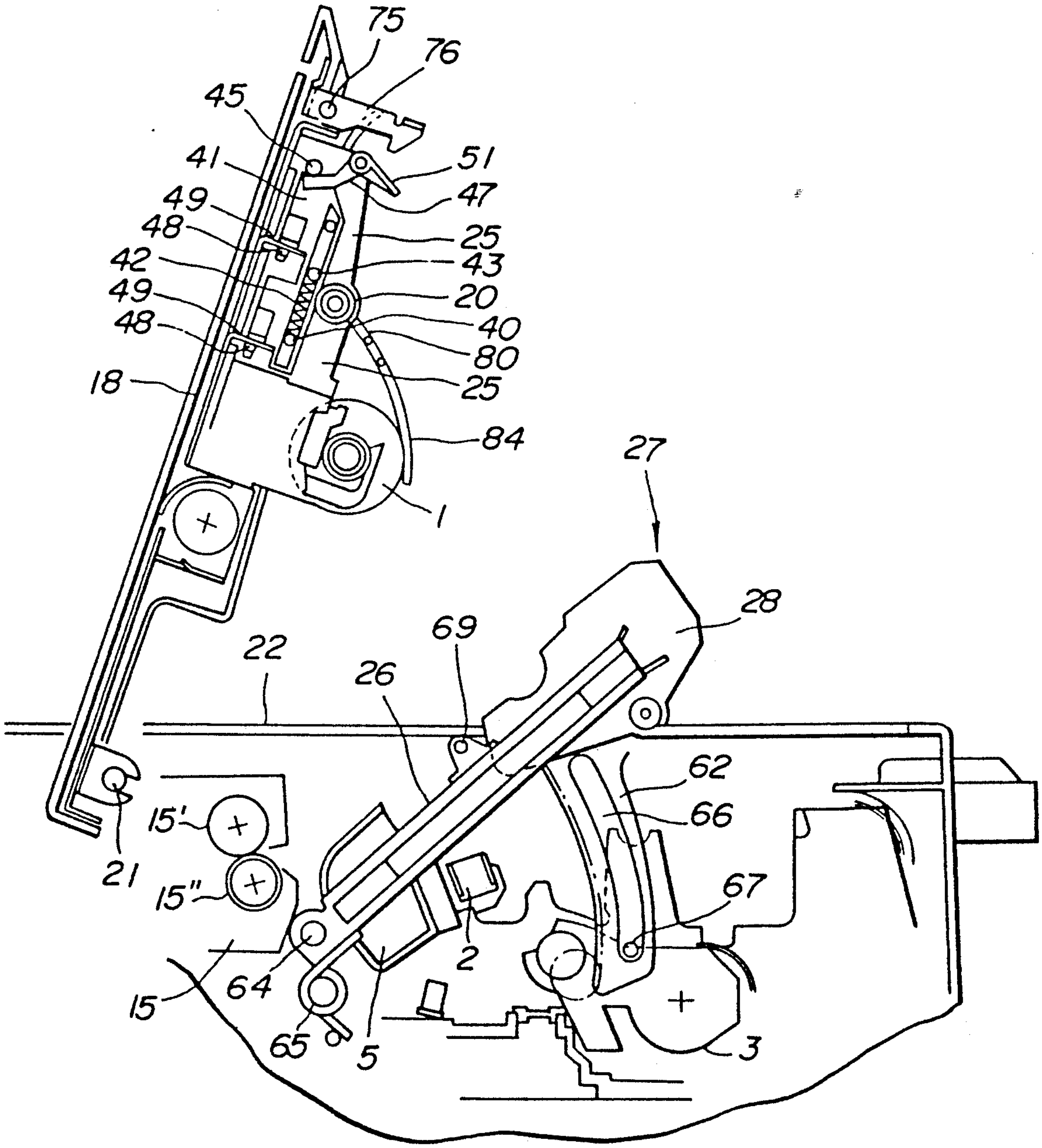
FIG. 4 is a side view partially illustrating the laser beam printer, in which the upper cover holding the drum unit is open.
Figure 5:
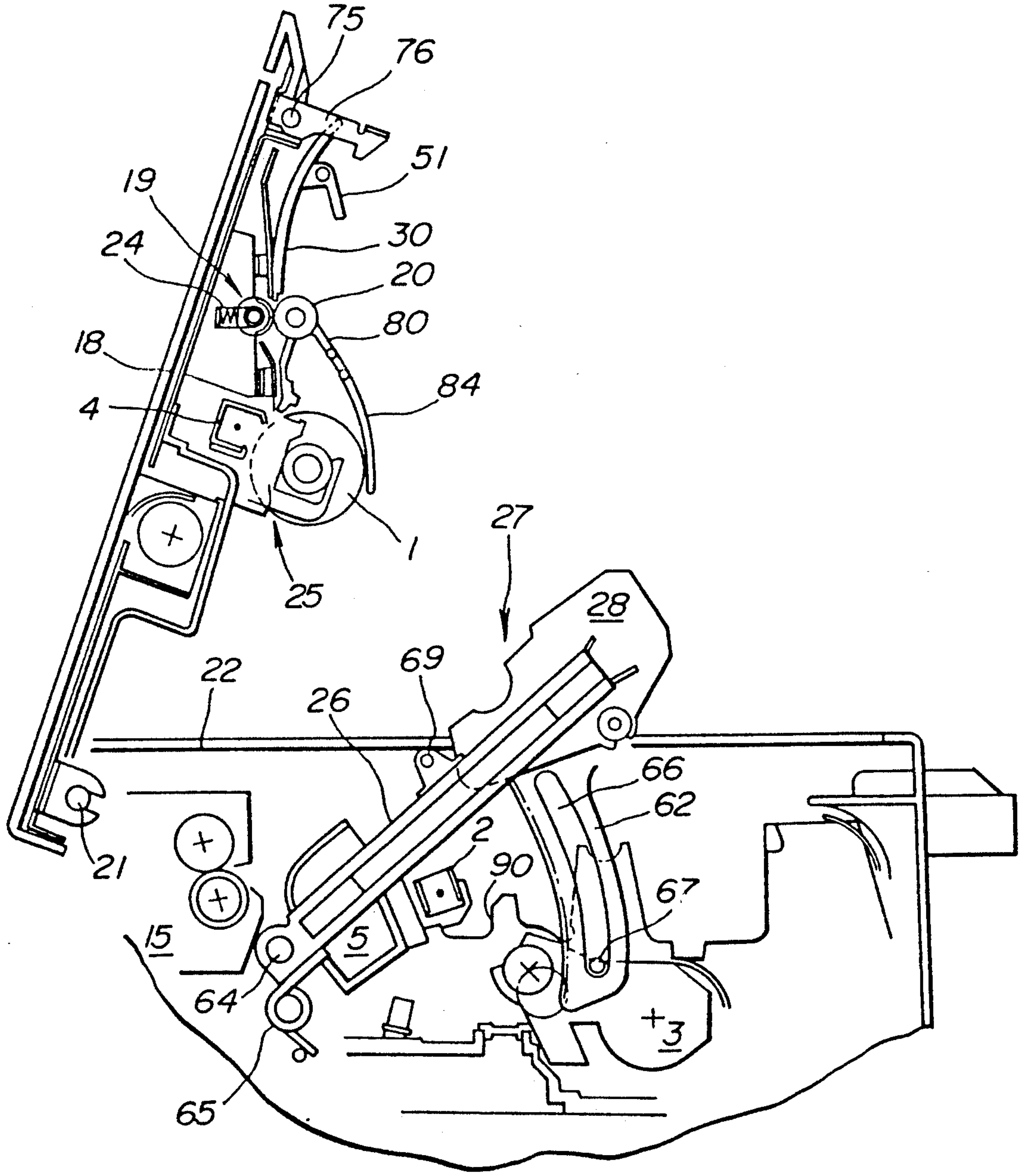
FIG. 5 is a side view partially illustrating the laser beam printer, in which the side frame thereof has been removed.

Alternatively, as shown in FIGS. 4 and 5, the drum unit 25 may be held in the upper cover 18 so that it moves along with the corona charger 4, and the pair of register rollers 12 consisting of the upper and lower register rollers 19 and 20.

As shown in FIGS. 4 and 5, when the drum unit 25 is moved to be opened together with the upper cover 18, a kit holder 26 also moves upward. Thereby, a replaceable kit 27 supported by the kit holder 26 is exposed through an opening formed above the main housing 22.

Figure 6:
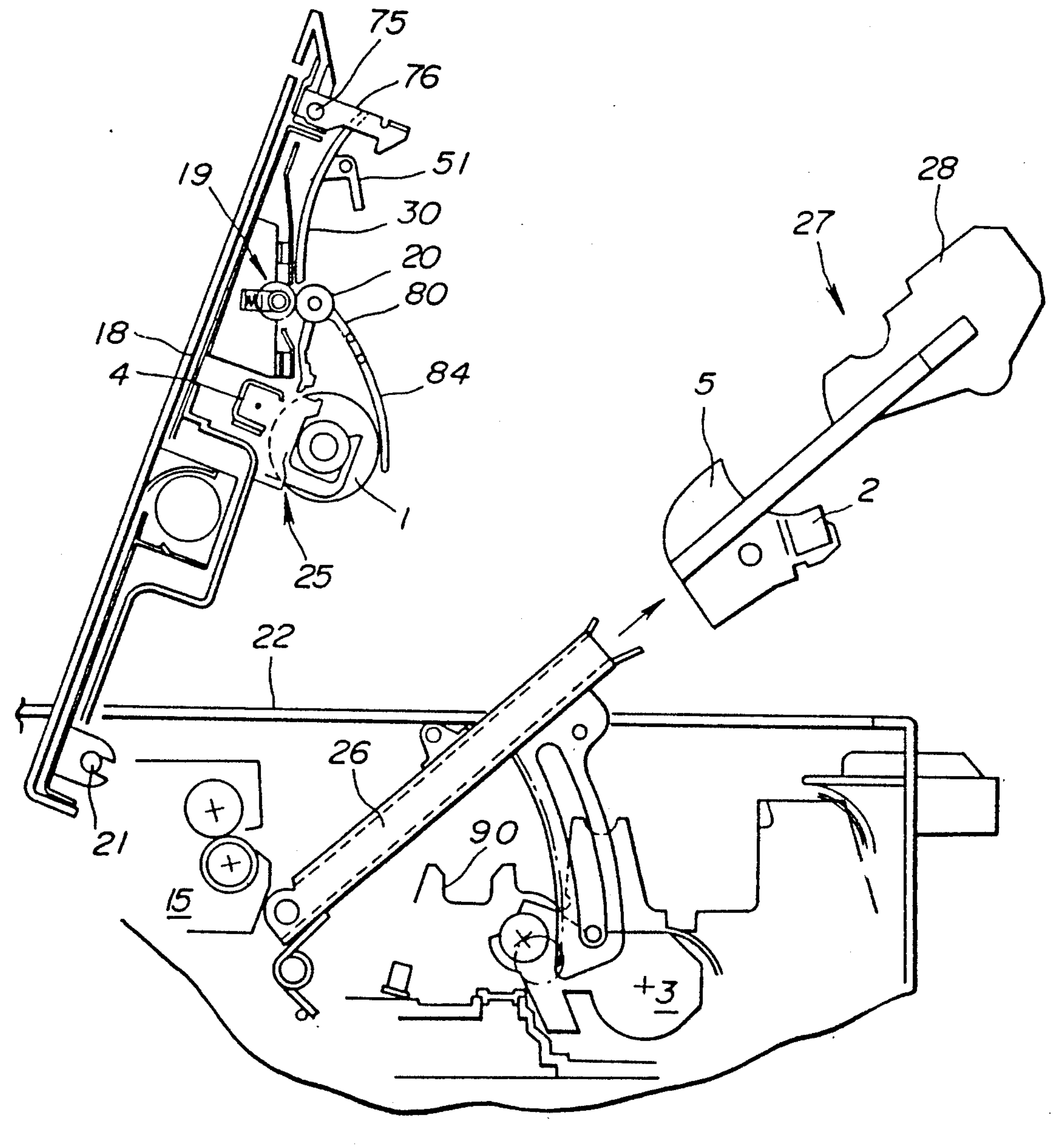
FIG. 6 is a side view partially illustrating the laser beam printer shown in FIG. 5, in which a replaceable kit has been removed.

The replaceable kit 27 may be formed only by a toner cartridge 28. Alternatively, the replaceable kit 27 may be formed so as to include the cleaning unit 5, the corona charger 2 and a toner cartridge 28 for the developing unit 3. The latter replaceable kit 27 is preferable in view of operation efficiency. The replaceable kit 27 can easily be taken out from the kit holder 26 in the direction indicated by an arrow shown in FIG. 6.

Figure 7:
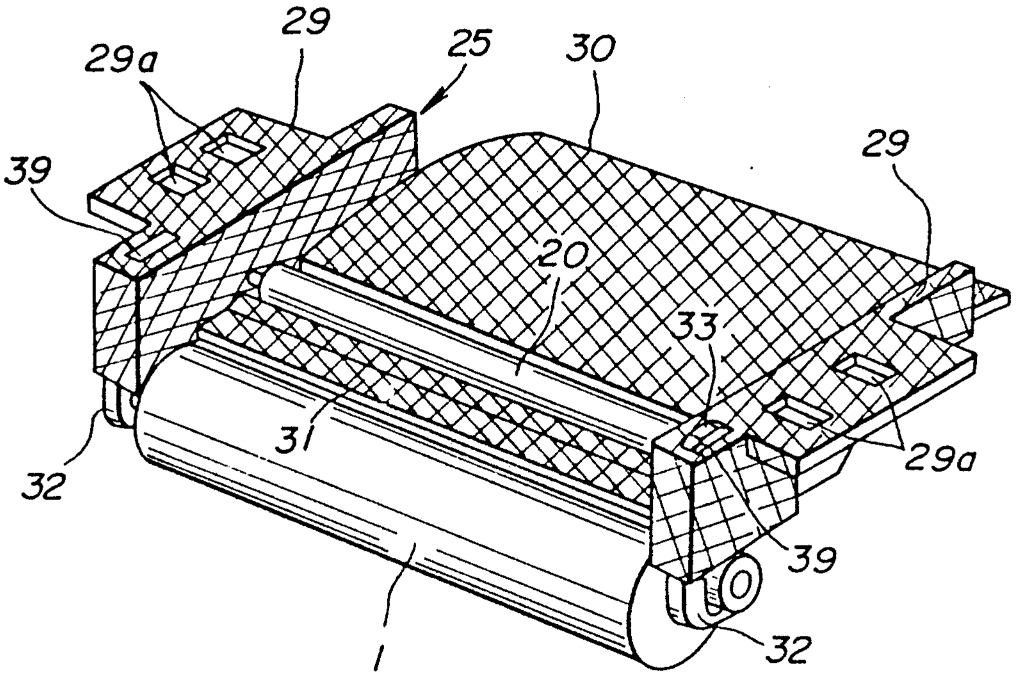
FIG. 7 is a perspective view of the drum unit.
Figure 8:
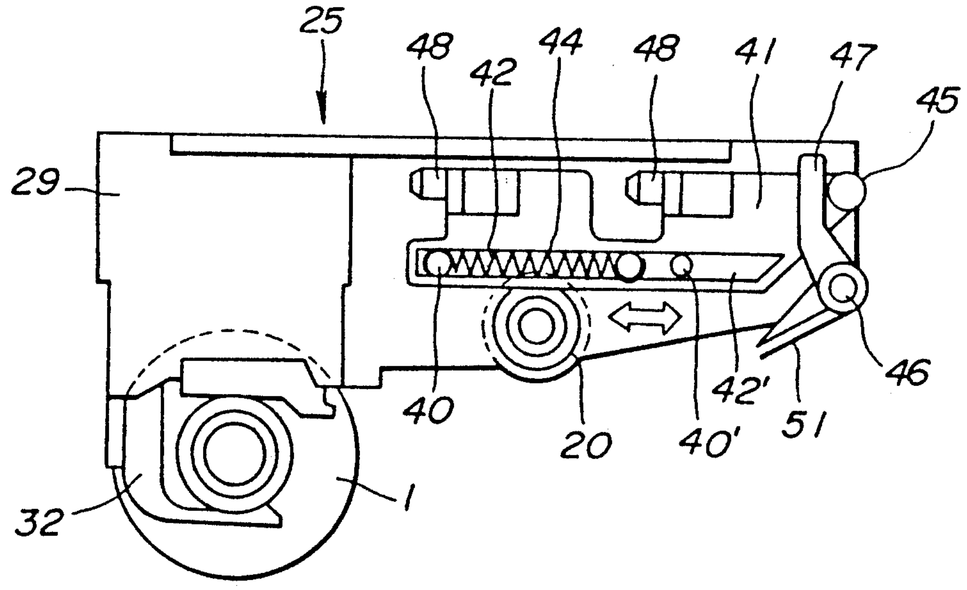
FIG. 8 is a front view of the drum unit.
Figure 9:
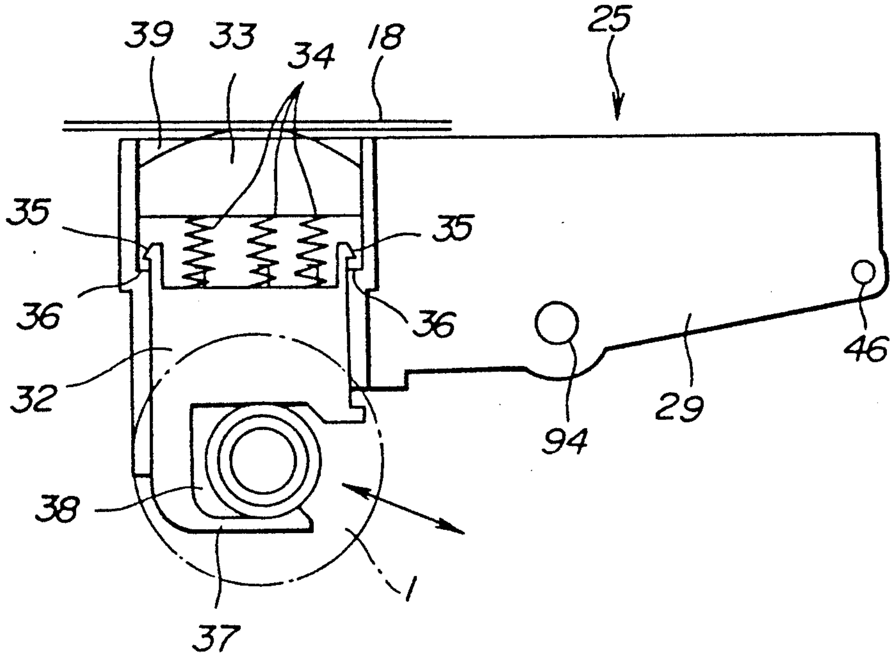
FIG. 9 is a side view partially illustrating the side frame.
Figure 21:
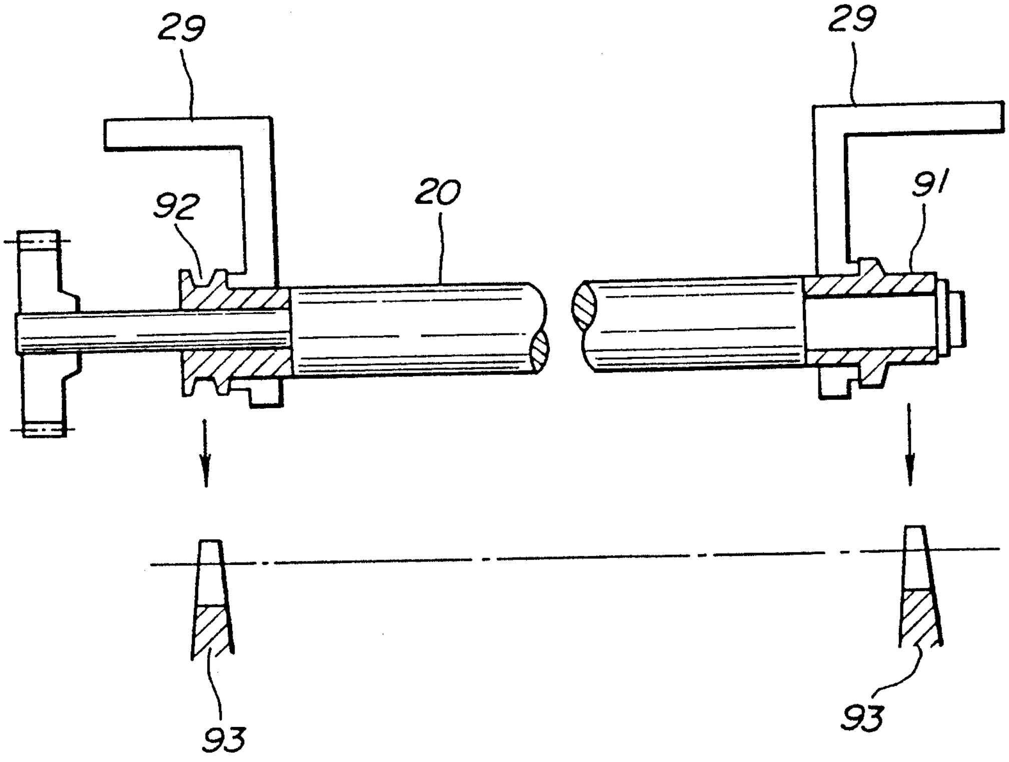
FIG. 21 is a cross sectional view illustrating the relationship between the drum unit and a lower register roller.

As shown in FIG. 7, the drum unit 25 includes side frames 29 which form a photosensitive drum holder and a register roller supporting member, and lower paper guide plates 30, 31 which are fastened to the side frame 29. It is possible to form the drum unit 25 so that the side frame 29 and the lower paper guide plates 30, 31 are integrally formed by a mold of resin. In FIG. 7, a portion which can be formed integrally is hatched for the sake of understanding the integrally formed drum unit 25. The lower register roller 20 is rotatably fastened to the side frame 29, as shown in FIGS. 8 and 9. A drum holder 3 which rotatably supports the photosensitive drum 1 is provided so that it can slide upward and downward in FIG. 9. The position of the lower paper guide plates 30 and 31 is selected by referring to a rotation supporting part of the lower register roller 20 as a reference. As shown in FIG. 21, the lower register roller 20 is rotatably fastened to the side frame 29 of the drum unit 25 through pillows 91 and 92. The pillows 91 and 92 are fitted into concave portions of register receiving portions 93 provided to the main housing 22, and are positioned therein. When the side frame 29 is integrated with the guide plates 30 and 31, a relative position of the guide plates 30, 31 and a hole 94 (FIG. 9) which supports the lower register roller 20 of the side frame 29 is settled. Thus, it is possible to definitely position the guide plates 30 and 31 by positioning the lower register roller 20 in the register receiving portions 93.

As shown in FIG. 9, a spring 34 is stretched between a stopper 33 and the drum holder 32, both of which are fastened to the side frame 29. Hook portions 35 of the drum holder 32 engage with corresponding stepped parts 36 of the side frame 29 due to elastic force of the spring 34 so that the photosensitive drum 1 is secured to the drum unit 25. The stopper 33 is formed so as to be allowed to project from the hole 39 formed in the side frame 29 so that the stopper 33 comes into contact with the upper cover 18. Thus, the photosensitive drum 1 is prevented from dropping off.

An elastic claw 37 of an approximately C-shaped structure in its cross section is formed at an end of the drum holder 32 having a concave area 38. A shaft of the photosensitive drum 1 is inserted into the concave area 38 through its opening and supported on a lower portion of the claw 37 so that the photosensitive drum 1 is prevented from dropping off with ease and it can rotate. When the shaft of the photosensitive drum 1 is inserted into or taken out from the concave space 38 in the direction of the illustrated arrow, the claw 37 is bent downward so as to facilitate inserting or taking out operation.

Figure 10:
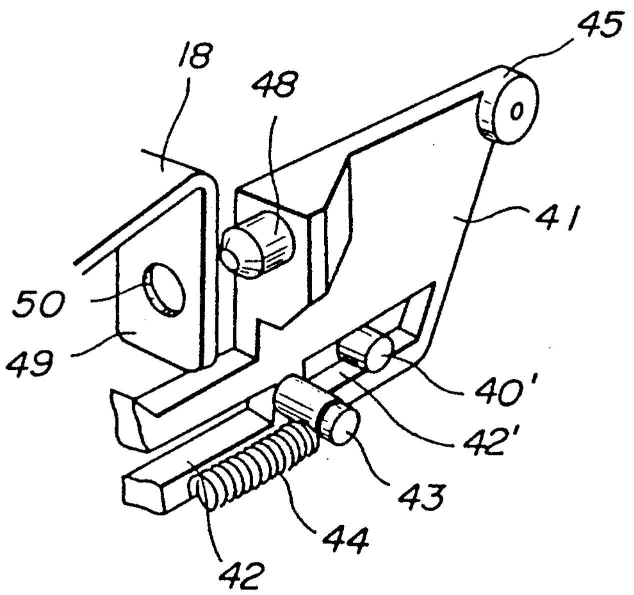
FIG. 10 is a perspective view illustrating the relationship between a release cam of the drum unit and an arm of the upper cover.

As shown in FIGS. 8 and 10, studs 40 and 40' are provided on each of the side frames 29 of the drum unit 25. The studs 40 and 40' are inserted into long holes 42 and 42' formed in a release cam 41 so that sliding is guided. A pin 43 is provided on the release cam 41. A cam spring 44 is provided between the pin 43 and the stud 40. The cam spring 44 generates force which causes the release cam 41 to move in the left direction in FIG. 8. The release cam 41 is further provided with a stopper projection 45. A cam release lever 47 which is rotatably supported by a stud 46 of the side frame 29 can come into contact with the stopper projection 45. Along with rotation of the cam release lever 47, the release cam 41 moves in the left or right direction in FIG. 8 with respect to the side frame 29. Engaging pins or projections 48 are provided on the release cam 41, and can be inserted into corresponding holes 50 formed in arms 49 of the upper cover 18 (see FIG. 11). Each of the arms 49 can be inserted into a related opening **29*a* formed in a surface of the side frame 29 which faces the upper cover 18**.

Figure 3:
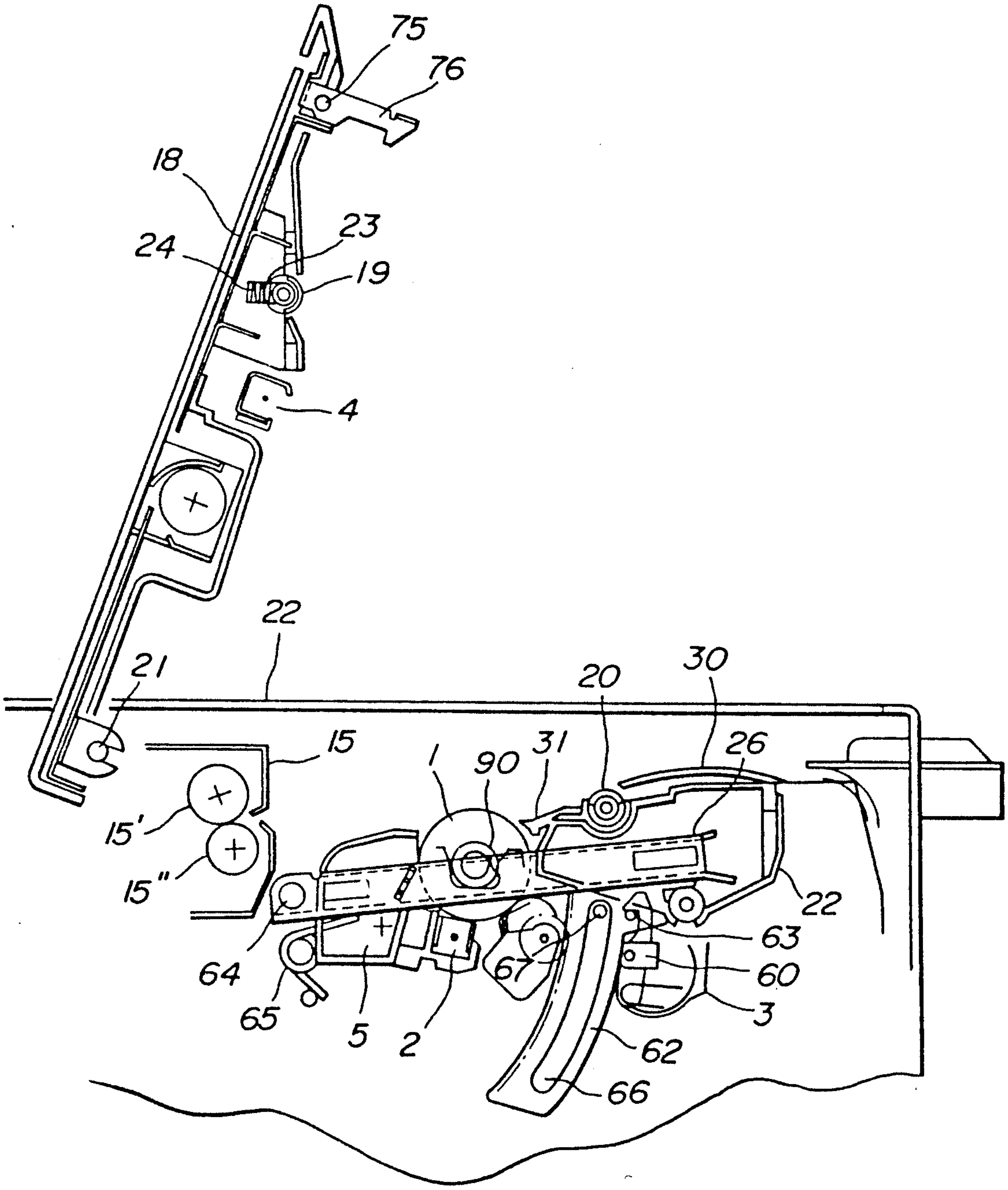
FIG. 3 is a side view partially illustrating the laser beam printer, in which a side frame of a drum unit has been removed.
Figure 11:
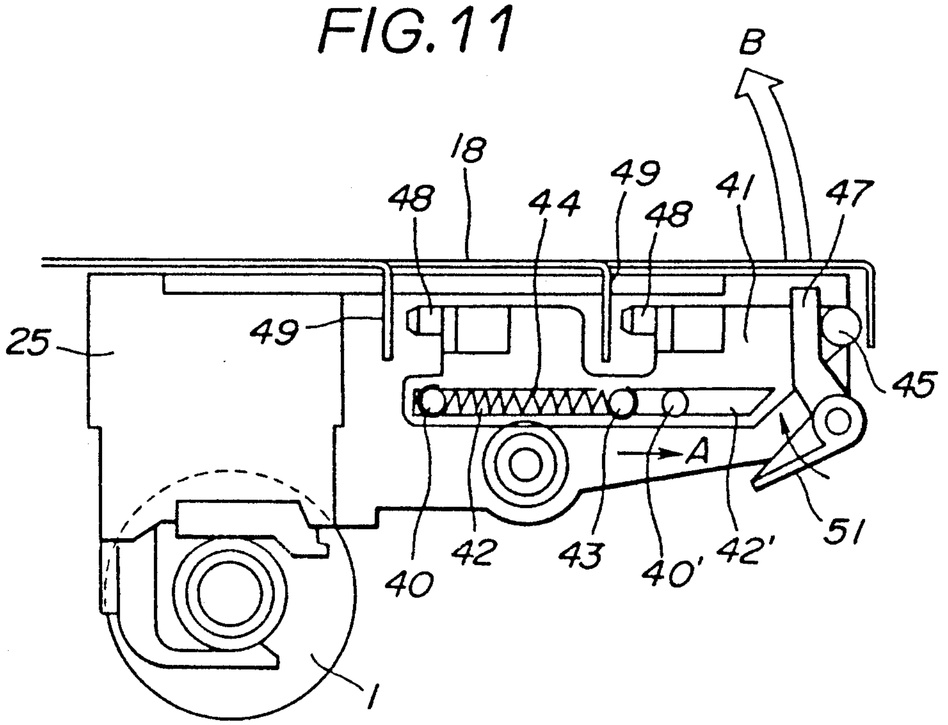
FIG. 11 is a front view illustrating a state where the drum unit is detached from the upper cover.

Referring to FIG. 11, when the cam release lever 47 is turned clockwise as indicated by the arrow, the stopper projection 45 is pushed by the cam release lever 47 so that the release cam 41 is moved in the direction of arrow A against the force caused by the spring 44. At this time, the engaging pins 48 are released from the holes 50 formed in the arms 49 of the upper cover 18. In this state, even when the upper cover 18 is moved to be made open in the direction of arrow B, the drum unit 25 cannot move together with the upper cover 18 as shown in FIGS. 2 and 3, so that it is left in the main housing 22.

Figure 12:
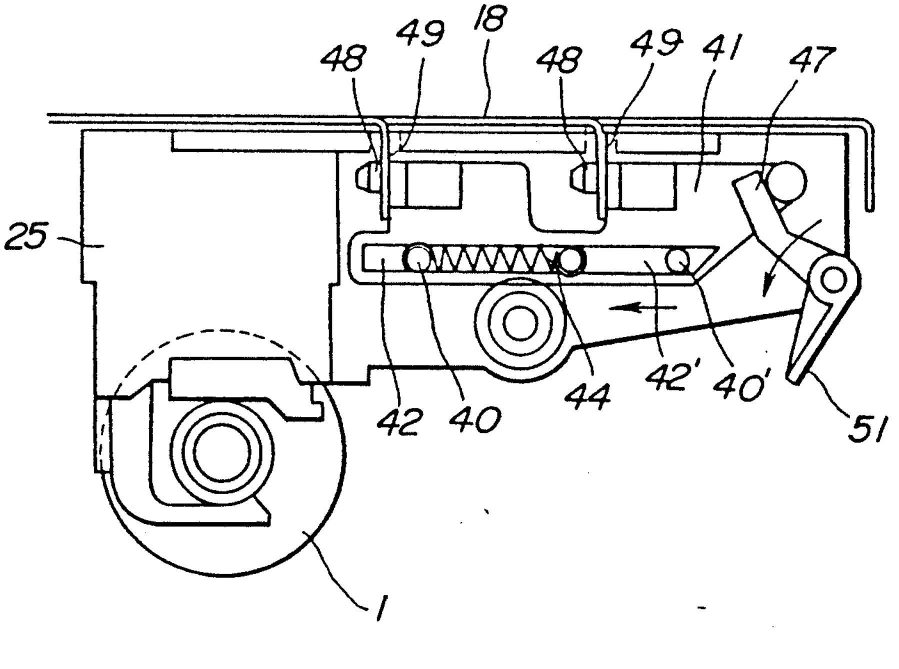
FIG. 12 is a front view illustrating a state where the drum unit is alternatively fastened to the upper cover.

As shown in FIG. 12, when the cam release lever 47 is turned counterclockwise or when a force exerted on the cam release lever 47 is removed so that it is subjected to the function of the spring 44, the release cam 41 is moved in the left direction. Then the engaging projections 48 of the release cam 41 become fitted into the holes 50 formed in the arms 49 penetrating the openings **29*a* of the side frame 29. Thus, the drum unit 25 is switched to a state where it has been locked in the upper cover 18. In this state, when the upper unit 18 is moved to be made open, the drum unit 25 moves together with the upper cover 18 so that the drum unit 25 is detached from the main housing 22**.

An arm 51 of the cam release lever 47 is formed at a free end which is different from the end thereof which comes into contact with the stopper 45. The arm 51 is provided with a clockwise rotation of arrow C by coming into contact with a first arm portion **52*a* of the release lever 52, as shown in FIG. 13**.

The release lever 52 is supported by the stud 53 fastened to the main housing 22 so that the release lever 52 can rotate. The release lever 52 is given force by a spring 54 which causes the release lever 52 to move counterclockwise as indicated by arrow D. A second arm portion **52*b* of the release lever 52 is coupled with a kit opening lever 55. The kit opening lever 55 is rotatably supported on the main housing 22 by a stud 56. A coupling mechanism is formed so that a pin 57 mounted to the kit opening lever 55 comes into contact with and can slide on the second arm portion 52*b* of the release lever 52. The coupling mechanism facilitates transfer of movement between the second arm portion 52*b* of the release lever 52 and the kit opening lever 55. Alternatively, the pin 57 may engage with a long hole (not shown) formed in the second arm portion 52***b*.

The kit opening lever 55 is provided with a handle 58, which projects from the main housing 22 outward. The kit opening lever 55 is coupled to an arm portion 60*a* of a release lever 60 through a link lever 59. The release lever 60 is supported by a stud 61 on the main housing 22 so that the release lever 60 can rotate. The release lever 60 has a hook portion 60*b* other than the arm portion 60. The hook portion 60*b* can engage with an arm 62 fastened to the kit holder 26, which is approximately located horizontally.

Figure 13:
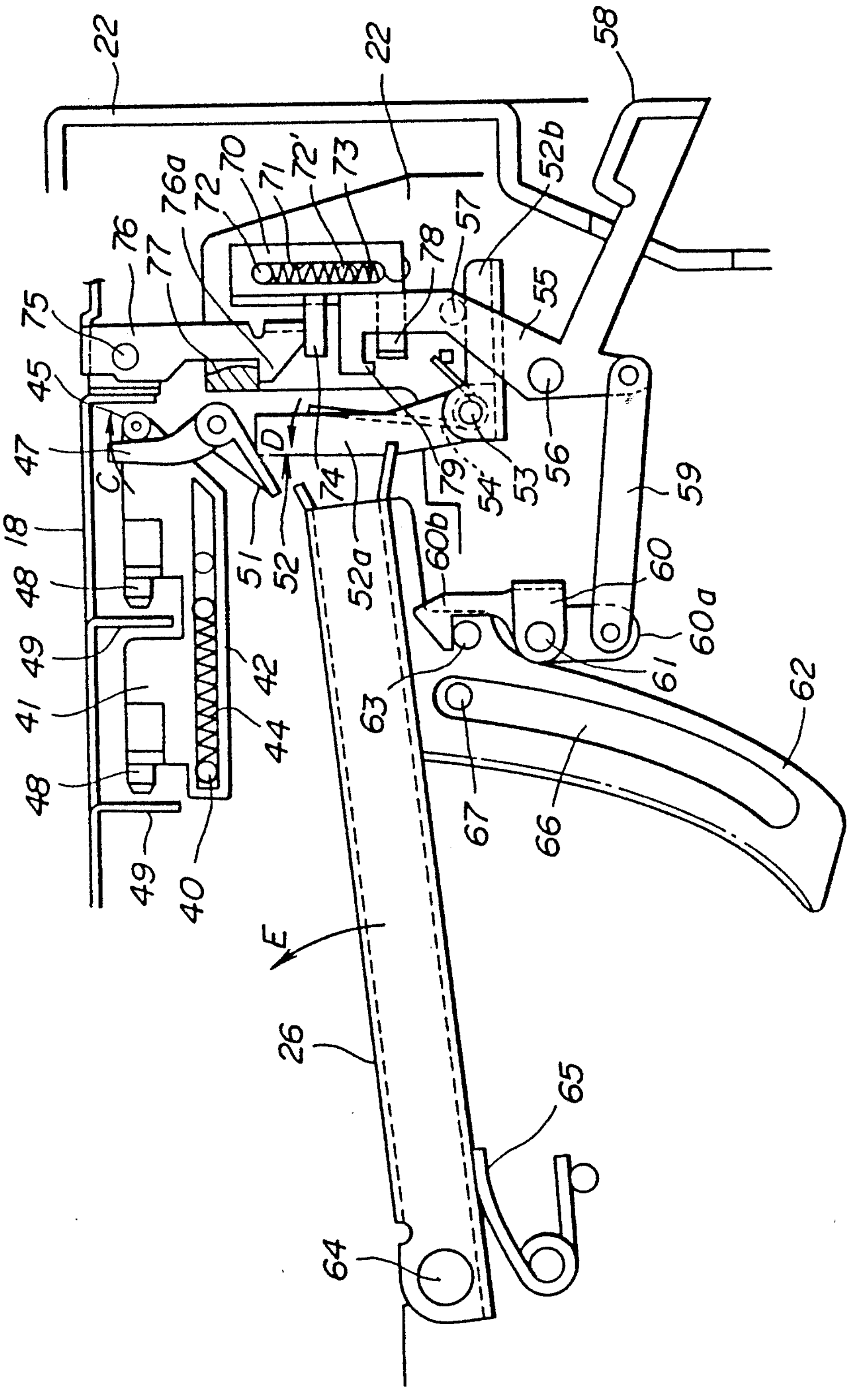
FIG. 13 is a front view of a lock releasing mechanism for a kit holder.

When the handle 58 is not operated, the release lever 52 is held at the position shown in FIG. 13 by the function of the spring 54. A stopper (not shown) may be formed so as to hold the handle 58 at the illustrated position. When the release lever 52 is held at the illustrated position, the release lever 60 is held at the position where it is caused to engage the pin 63 by the kit opening lever 55 and the link lever 59. That is, the kit holder 26 is held at the position shown in FIG. 13. At this time, the release lever 52 pushes the arm 51 of the cam release lever 47 and moves the arm 51. Thus the arms 49 of the upper cover 18 are detached from the corresponding engaging pins 48. In this state, when the upper cover 18 is open, the drum unit 25 is left in the main housing 22.

Figure 14:
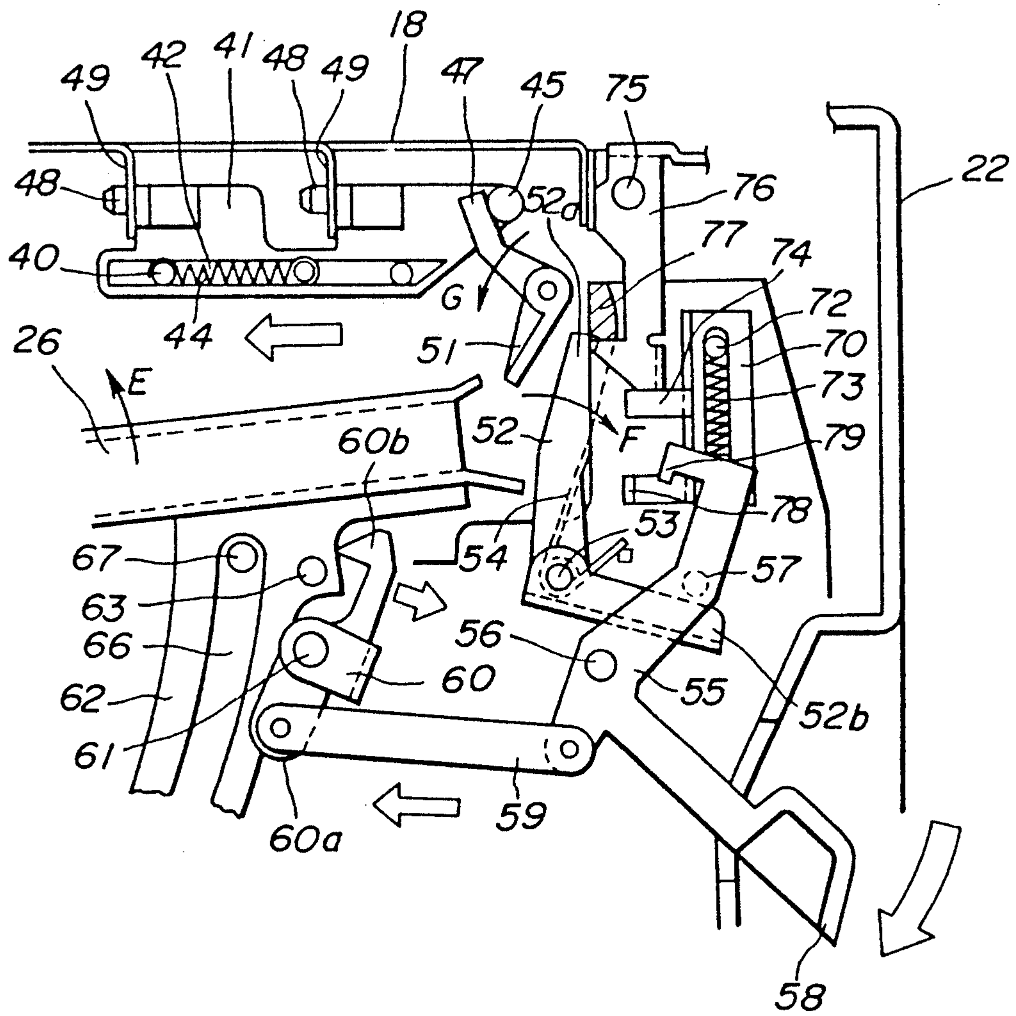
FIG. 14 is a diagram illustrating a state where the lock has been released.

When the handle 58 is operated, that is, the handle 58 is pushed in the direction of the arrow shown in FIG. 14, the release lever 52 is rotated in the direction of arrow F, and is thus detached from the arm 51 of the cam release lever 47. Thus, the cam release lever 47 is caused to rotate in the direction of arrow G, so that the release cam 41 can move in the left direction by the force provided by the cam spring 44. Thus, the engaging pins 48 of the release cam 41 are inserted into the holes 50 formed in the arms 49 of the upper cover 18, so that the drum unit 25 can be fastened to and locked in the upper cover 18. When raising the upper cover 18, the drum unit 25 is also raised.

When the handle 58 is pushed down, force exerted on the cam release lever 47 is removed, and simultaneously the release lever 60 is moved through the link lever 59. Thus, the hook portion 60*b* is released from the engagement with the pin 63. As a result, the kit holder 26 is made free from the engaging state shown in FIG. 13.

As shown in FIG. 13, the kit holder 26 is rotatably supported by a supporting shaft 64 provided on the main housing 22, and is urged upward as indicated by arrow E by a spring 65. A guide groove 66 is formed in the arm 62 fastened to the kit holder 26. A pin 67 provided on the main housing 22 engages the guide groove 66 so that an upward opening angle for the kit holder 26 is defined.

The kit holder 26 is coupled to the upper cover 18 so that the kit holder 26 can ascend or descend by interlocking with the opening and closing movement of the upper cover 18. When the upper cover 18 is opened in the state where the kit holder 26 is released from the engagement with the hook portion 60*a* of the release lever 60, the kit holder 26 also moves up.

Figure 22:
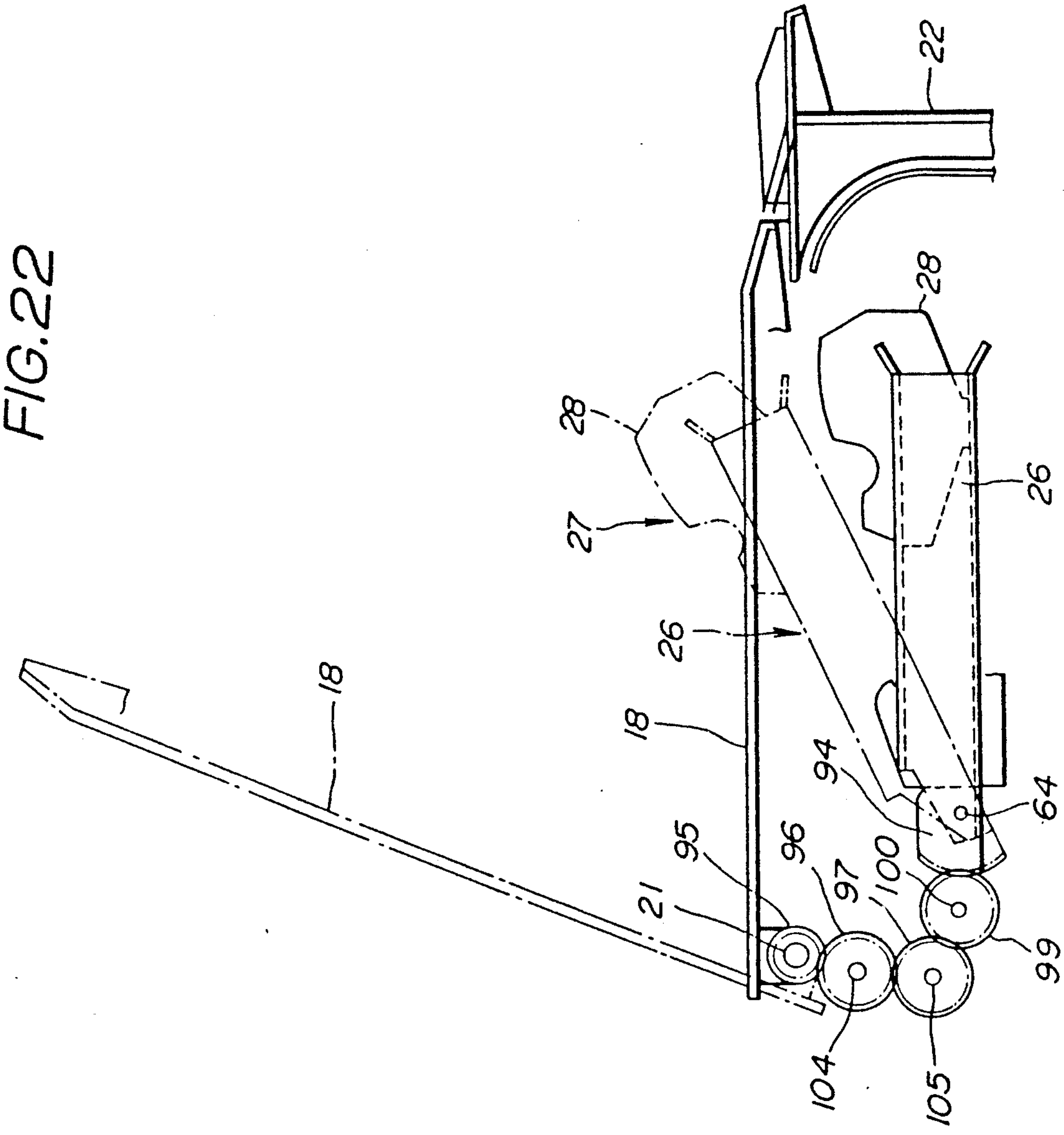
FIG. 22 is a diagram of an interlocking mechanism of the upper cover and the kit holder.
Figure 23:
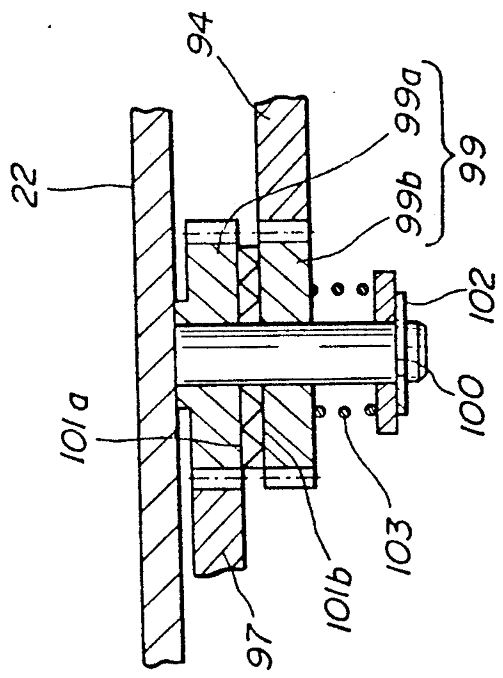
FIG. 23 is a cross sectional view of a portion which includes slide ring gears used in the mechanism shown in FIG. 22.

A mechanism which enables the upper cover 18 and the kit holder 26 to interlock is illustrated in FIG. 22. In the case where the kit holder 26 is rotatably fastened to the supporting shaft 64, a fan gear 94 which rotates along with the kit holder 26 is fixed to the kit holder 26. Alternatively, in the case where the kit holder 26 is fixed to the supporting shaft 64 which is rotatably supported on the main housing 22, the fan gear 94 is fastened to the supporting shaft 64. A hinge gear 95 is fixed to the supporting shaft 21 of the upper cover 18 or to a portion which is rotatably fastened to the supporting shaft 21 of the upper cover 18. The hinge gear 95 engages a first idle gear 96, which engages a second idle gear 97. As shown in FIG. 23, the second idle gear 97 engages a first ring gear 99*a* of a slide ring gear 99. A second ring gear 99*b* of the slide ring gear 99 engages a fan gear 94.

Figure 24:
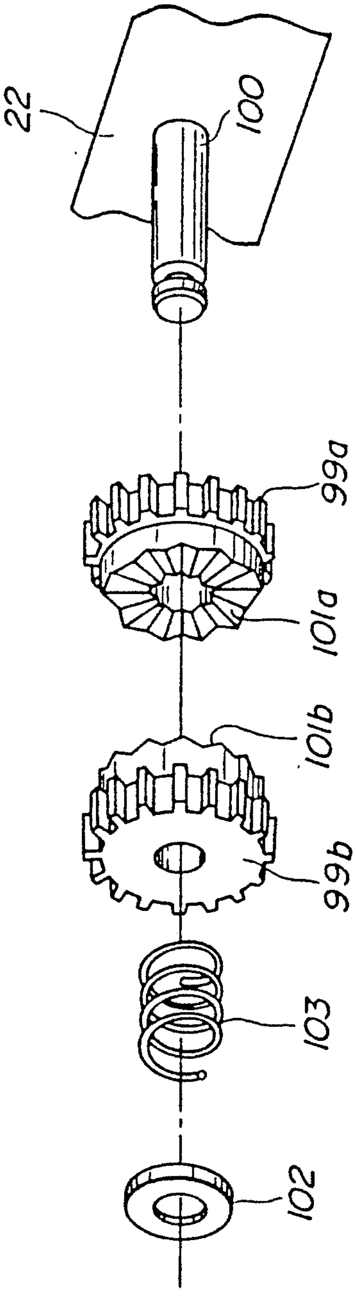
FIG. 24 is a perspective view of the disassembled slide ring gears.

Both the ring gears 99*a* and 99*b* of the slide ring gear 99 are supported by a common shaft 100, which is fastened to a side plate of the main housing 22 so that they can rotate. As shown in FIG. 24, ring-shaped gear teeth 101*a* and 101*b* are provided on opposite surfaces of the ring gears 99*a* and 99*b*, respectively. The second ring gear 99*b* is pushed toward the first ring gear 99*a* by a spring 103 provided between a spring bearing ring 102 fastened to the shaft 100 and the second ring gear 99*b* so that the gear teeth 101*a* and 101*b* engage with each other. Thus, both the ring gears 99*a* and 99*b* run idle when a load exceeding a predetermined value is exerted thereon. As shown in FIG. 22, shafts 104 and 105 which rotatably support the first and second idle gears 96 and 97, respectively, are also fastened to the side plate of the main housing 22.

Referring to FIG. 22, when the upper cover 18 is opened, the hinge gear 95 rotates together with the upper cover 18. The rotation of the hinge gear 95 is transferred to the fan gear 94 through the first and second idle gears 96, 97 and the slide ring gear 99. Thus, the kit holder 26 interlocks with the upper cover 18 and is rotated upward. In this case, the rotating angle of the kit holder 26 is less than the opening angle of the upper cover 18. Thus, even after the kit holder 26 comes into contact with the stopper (not shown) and is rotated up to an upper limit position indicated by a one-dot chain line shown in FIG. 22, the upper cover 18 can further be opened. At this time, sliding occurs between the first ring gear 99*a* and the second ring gear 99*b*, and causes them to run idle. Thus, the kit holder 26 is held at the upper limit position while being in contact with the stopper. Hence, it is possible to exchange the replaceable kit 27 supported in the kit holder 26 in the state where obliquely projects from the main housing 22 (at a maintenance position).

When the upper cover 18 is closed, the kit holder 26 is rotated downward until it is changed to the horizontal state indicated by a solid line shown in FIG. 22. Since the first and second ring gears 99*a* and 99*b* start sliding when a load exceeding the predetermined load is exerted thereon. Thus, it is possible to rotate the kit holder 26 upward or downward even while the upper cover 18 is held open.

Figure 15:
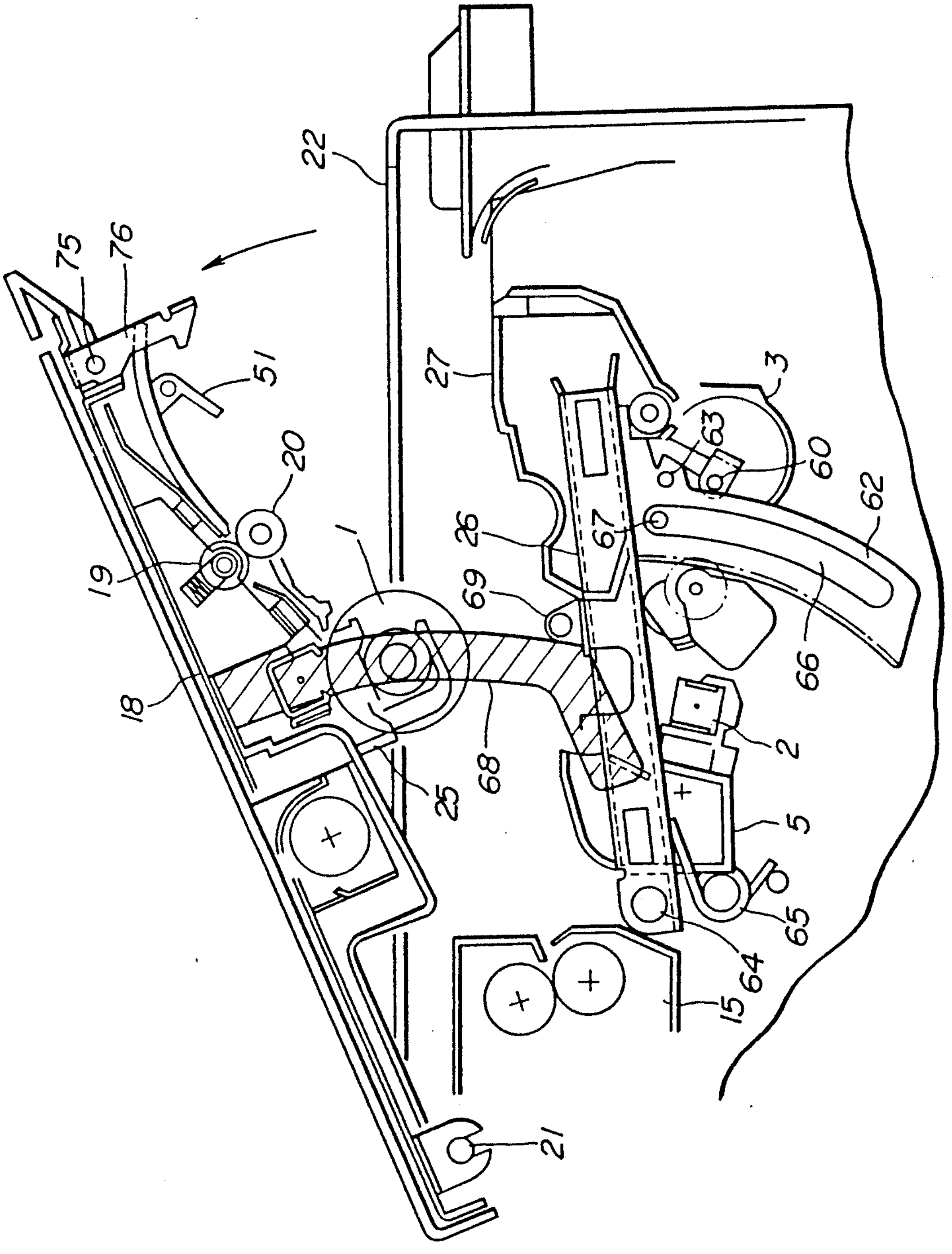
FIG. 15 is a diagram illustrating a structure which prevents the kit holder from being opened at the initial stage of opening the upper cover.
Figure 16:
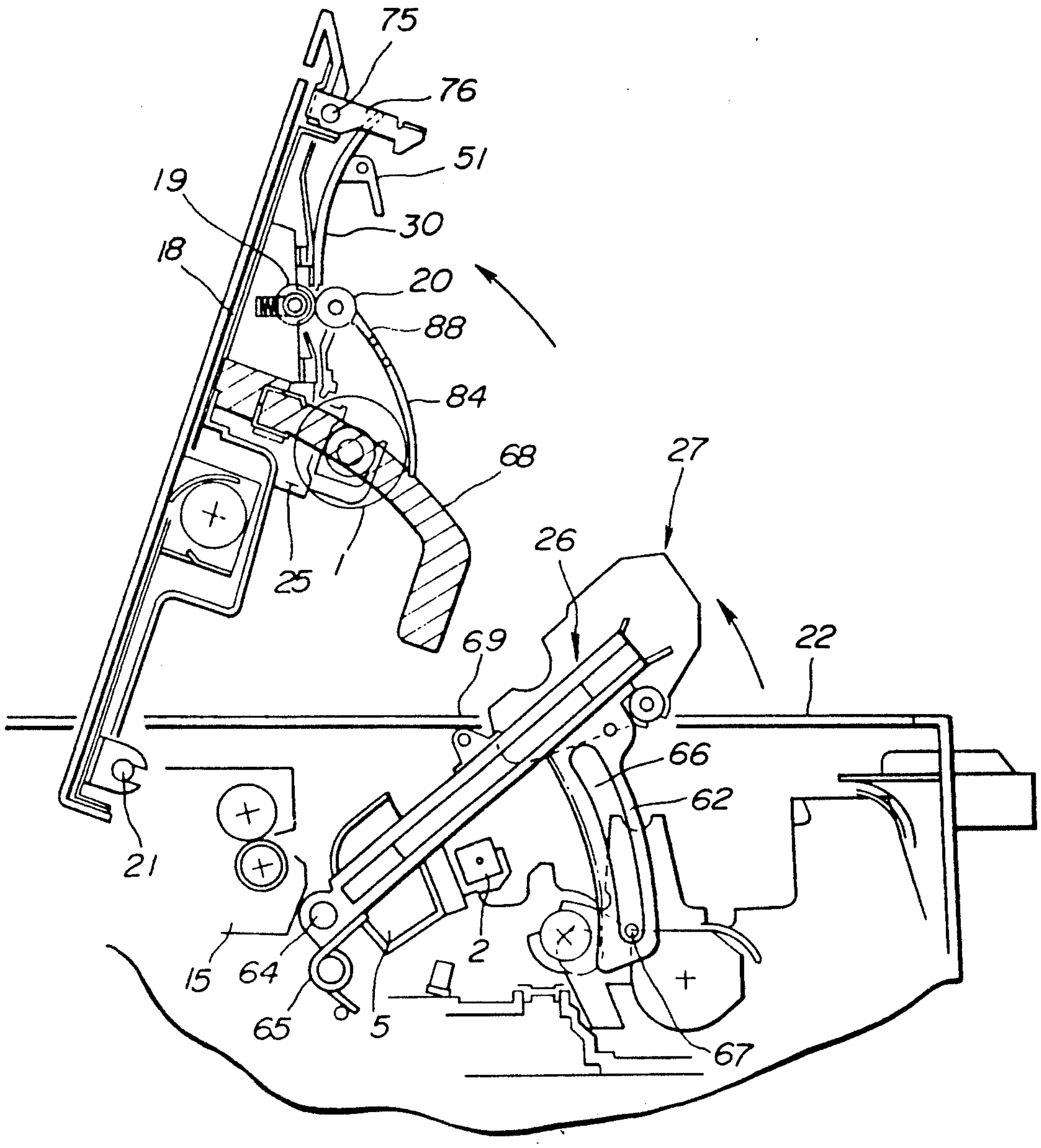
FIG. 16 is a diagram illustrating a state where the kit holder has been released from the state shown in FIG. 15.

However, there is a possibility that the photosensitive drum 1 may be damaged or fingers of the operator may unexpectedly be put between the upper cover 18 and the main body 22 if the kit holder 26 starts going up at the same time as the operator starts opening the upper cover 18. In order to eliminate the possibility, as shown in FIG. 15, the upper cover 18 is provided with a holder pressing lever 68, and the kit holder 26 is provided with a stud 69. Until the upper cover 18 is opened to the predetermined opening angle, the stud 69 is kept into contact with the holder pressing lever 68, so that the kit holder 26 is prevented from going up. When the upper cover 18 is opened over the predetermined opening angle, the holder pressing lever 68 is detached from the stud 69, so that the kit holder 26 is allowed to ascend as shown in FIG. 16. The pin 67 can come into contact with the lower end of the guide groove 66 so that the opening angle of the kit holder 26 is limited and a sufficient space is formed between the kit holder 26 and the upper cover 18. In this case, an interlocking mechanism which lets the upper cover 18 and the kit holder 26 interlock is different from the mechanism shown in FIGS. 22 through 24, and is made up of the holder pressing lever 68, the stud 69 and the spring 65.

Adversely, when the upper cover 18 is closed, the upper cover 18 goes down. When the upper cover 18 goes down by an angle, the holder pressing lever 68 comes into contact with the stud 69 so that the stud 69 is pressed down. That is, the kit holder 26 is pressed down. When the kit holder 26 reaches the position shown in FIG. 15, the pin 63 engages with the hook portion 60*b* of the release lever 60. The upper cover 18 is further depressed, the holder pressing lever 68 is released from the engagement with the pin 63 and slides along the pin 63.

Even when only the kit holder 26 is pressed down from the opening position while the upper cover 18 is held open, the pin 63 can engage with the release lever 60 so that the kit holder 26 is locked in the main housing 22.

The upper holder 18 is not coupled to the kit holder 26 at all. Thus, even when the operator happens to depress only the kit holder 26, the upper cover 18 is not allowed to go down. As a result, fingers of the operator are protected from being unexpectedly injured. The operator can put the replaceable kit 27 in the predetermined position.

When jammed paper is removed, it is convenient that as shown in FIGS. 2 and 3, the upper cover 18 is open while the drum unit 25 is left in the main housing 22 so that the paper path extending over the photosensitive drum 1 can appear. If the operator mistakenly depresses the handle 58 of the kit opening lever 55 in the above-mentioned state, the kit holder 26 will goes up unexpectedly. This is dangerous. Further, since positioning the photosensitive drum 1 and the replaceable kit 27 is a heart of the electrophotographic process, it must be done with high precision. For these reasons, it is necessary to avoid frequently separating the replaceable kit 27 from the photosensitive drum 1. Moreover, toner particles may be dropped by separating the replaceable kit 27 from the photosensitive drum 1. For the above-mentioned reasons, it is necessary for the kit holder 26 to be inadvertently opened while the upper cover 18 is open.

For this purpose, as shown in FIG. 13, a stopper 70 is formed on the main housing 22. A long hole 71 is formed in the stopper 70. Studs 72 and 72' provided on the main housing 22 are inserted into the long hole 71. The stopper 70 can slide along the long hole 71 upward or downward. A spring 73 is stretched between the stopper 70 and the stud 72, and gives the stopper 70 upward force. The stopper 70 is provided with an ear 74. When closing the upper cover 18, an end of a lock lever 76 which is rotatably supported at a fulcrum 75 of the upper cover 18 is brought in contact with the ear 74, and thus depresses the stopper 70 against the force provided by the spring 73. The hook portion 76*a* of the lock lever 76 is hooked on a projection 77 of the main housing 22 so that the upper cover 18 is locked at its closed position. The lock lever 76 is given force which is directed to rotating the lock lever 76 to the lock position. When the upper cover 18 is opened, the lock lever 76 is pulled up by hand so that the hook portion 76*a* is released from the engagement with the projection 77 and thus the upper cover 18 can be raised.

The stopper 70 is provided with a stopper claw 78, and the kit opening lever 55 is provided with an engagement claw 79 which can engage with the stopper claw 78. When the upper cover 18 is closed and the lock lever 76 is in contact with the projection 77, the ear 74 is being pushed down by the lock lever 76 and thus the stopper 70 is in the depressed state. When the stopper 70 is in the depressed state, the stopper claw 78 has been descended. Thus, the engagement claw 79 of the kit opening lever 55 has been released from the engagement with the stopper claw 78. Thus, it is possible to depress the handle 5 to thereby release the kit holder 26 from the locked state.

Figure 17:
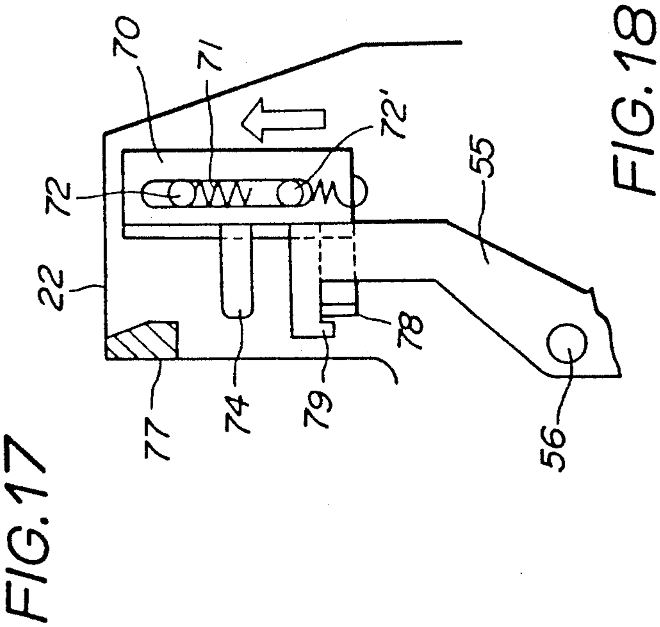
FIG. 17 is a diagram illustrating a stopper positioned in a state where a handle of the lock releasing mechanism for the kit holder is in the locked state.

When the upper cover 18 is opened in the state where the kit holder 26 is not released from the locked state, the lock lever 76 is released from the engagement with the projection 77 in the state where the stopper 70 is positioned as shown in FIG. 13. The lock lever 76 goes up and thus the depressing force exerted on the ear 74 becomes zero so that the stopper 70 can go up by the force of the spring 73. When the stopper 70 goes up, as shown in FIG. 17, the stopper claw 78 comes into contact with the engagement claw 79. Hence, even when trying to depress the handle 78, the stopper claw 78 prevents the movement of the kit opening lever 55 so that the handle 58 can be locked.

Figure 18:
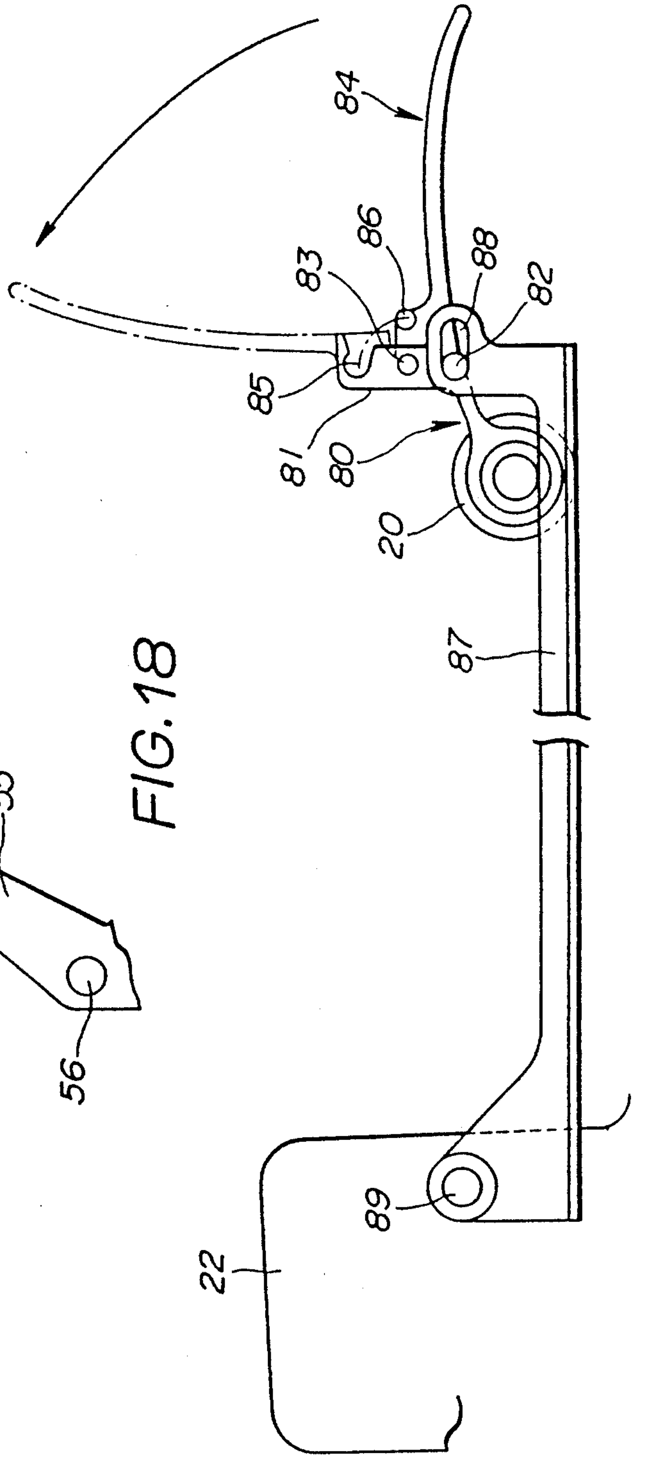
FIG. 18 is a diagram partially illustrating the drum cover for protecting a photosensitive drum when opening the upper cover.
Figure 19:
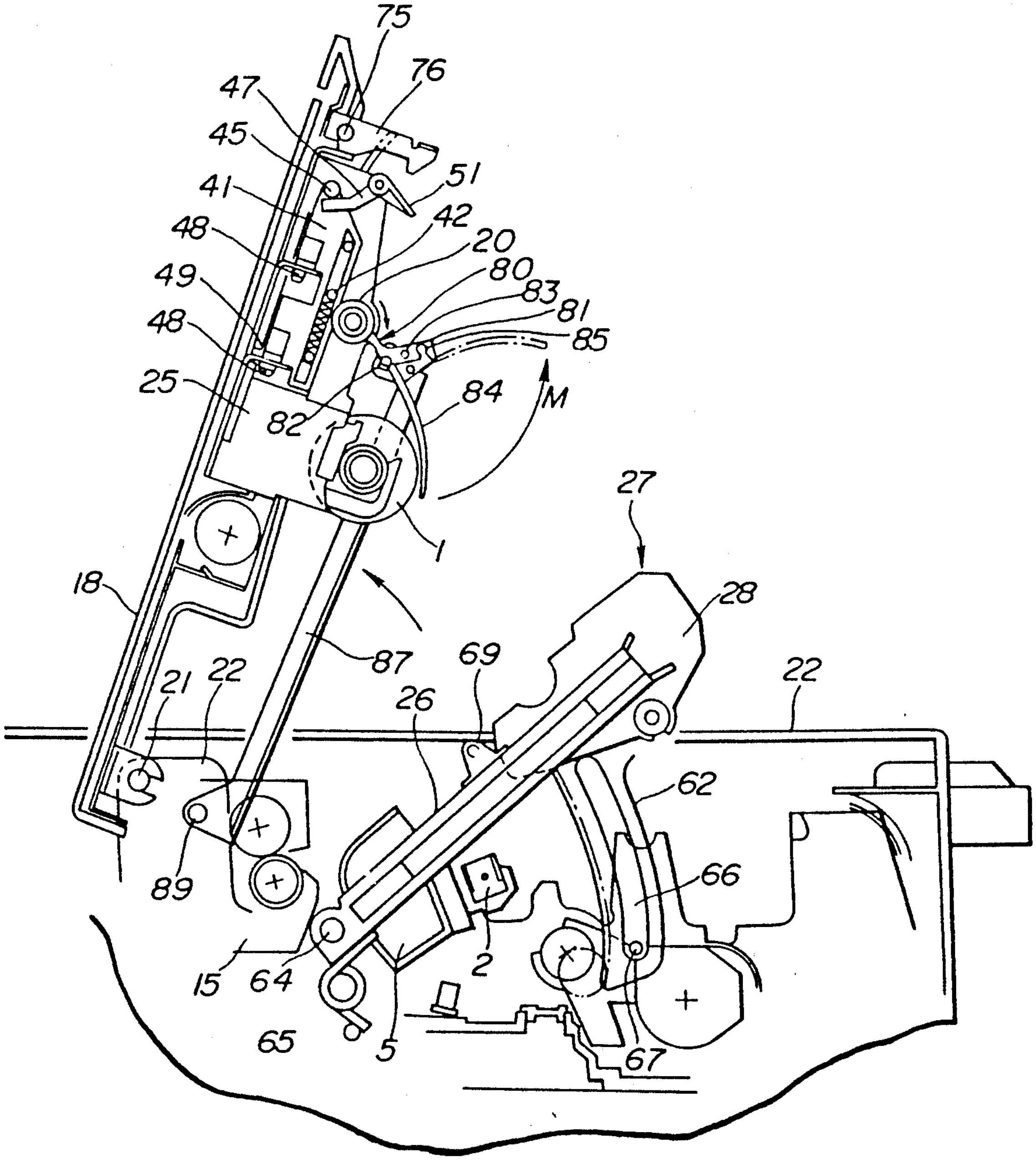
FIG. 19 is a diagram of the drum cover which is in the opening state.

In the case where the drum unit 25 is held in the upper cover 18, there is a possibility that the photosensitive drum 1 is exposed and may be damaged or fatigued by light irradiated onto the photosensitive drum 1. In order to eliminate the possibility, as shown in FIGS. 18 and 19, a first drum cover 80 is attached to the shaft of the lower register roller 20 positioned below the drum unit 25 so that the first drum cover 80 can rotate. A side end of an end portion of the first drum cover 80 is provided with an ear 81. The ear 81 has a base to which a coupling pin 82 is attached. A second drum cover 84 is rotatably supported on an intermediate portion of the ear 81 at a fulcrum 83. The second drum cover 84 is provided with a lock pin 86, which can be inserted into and detached from a lock hole 85 formed in the ear 81. When the second drum cover 84 rotates to a position indicated by a one-dot chain line in FIG. 18, the lock pin 86 is allowed to fit into the lock hole 85 so that the second drum 84 can be locked.

The coupling pin 82 related to the first drum cover 80 is inserted into a long hole 88 formed in an end of a drum cover link 87, the other end of which is fastened at a fulcrum 89 to the main housing 22 so that it can rotate.

When the lower register roller 20 is moved upward together with the drum unit 25 by the upper cover 18, as shown in FIG. 19, the drum cover link 87 pivots on the fulcrum 89. The lower register roller 20 starts moving upward, and the first drum cover 80 pivots on the shaft of the lower register roller 20. The second drum cover 84 moves with its own weight together with the first drum cover 80 in the state indicated by a solid line in FIG. 18, so that the photosensitive drum 1 is shielded. Hence, it is possible to prevent the surface of the photosensitive drum 1 from being damaged or fatigued by incident light.

Figure 20:
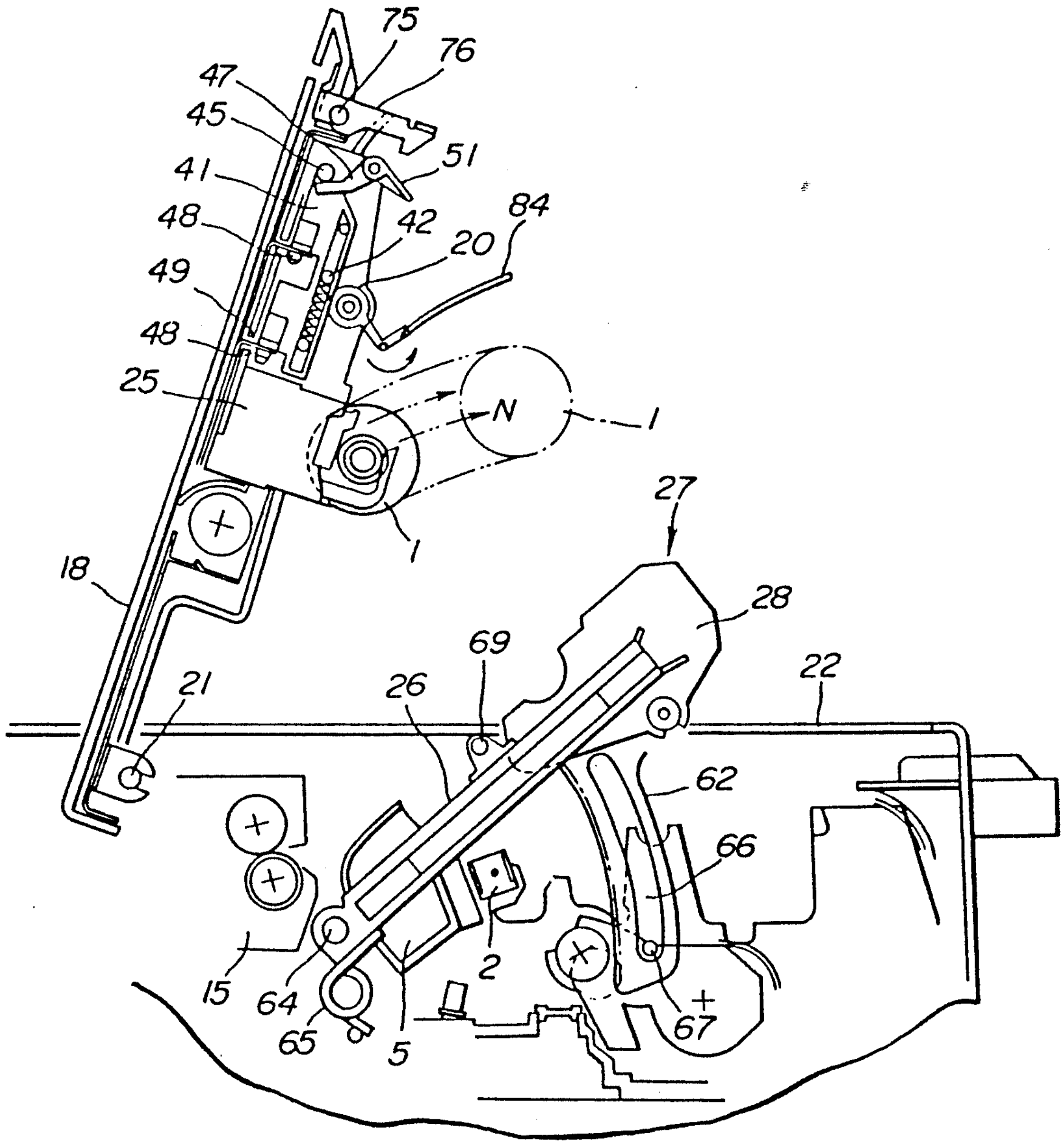
FIG. 20 is a diagram illustrating the photosensitive drum which is in a state where it may be detached from the kit holder.

Referring to FIG. 19, when letting the second drum cover 84 rotate around the fulcrum 83 and letting the lock pin 86 engage into the lock hole 85, the state indicated by the one-dot chain line is obtained. Thus, the shield for the photosensitive drum 1 is removed. In this state, as indicated by the arrow shown in FIG. 20, it is possible to take out the photosensitive drum 1 from the concave portion 38 (FIG. 9) of the drum holder 32 or alternatively insert the same therein.

As is illustrated in FIGS. 2 and 3, when the drum unit 25 is held in the main housing 22, the shaft of the photosensitive drum 1 is supported on a bearing 90 (FIG. 6) of the main housing 22. When the upper cover 18 is closed, pressing force provided by the closed upper cover 18 is exerted on the stopper 33, the spring 34 and the drum holder 32 in this order so that the photosensitive drum 1 can correctly be positioned and held in the bearing 90.

When pulling up the lock lever 76 to thereby push up the upper cover 18, only the upper cover 18 is raised in the state the drum unit 25 is held in the main housing 22. Then an area above the photosensitive unit 1 as well as an area above the lower paper guide plates 30 and 31 are available.

When depressing the handle 58, the release cam 41 locks the drum unit 25 in the upper cover 18 and releases the kit holder 26 from the locked state. When drawing the lock lever 76 to thereby push up the upper cover 18, the drum unit 25 goes up together. Then the upper cover 18 is opened by the predetermined opening angle, and thereafter the kit holder 26 moves to be opened. At this time, the photosensitive drum 1 is shielded by the first drum cover 80 and the second drum cover 84, so that the replaceable kit 22 becomes detachable. When rotating the second drum cover 84 so as to be locked, the photosensitive drum 1 is released from the shielded state, so that the photosensitive drum 1 can be replaced with another one.

The present invention is not limited to the aforementioned embodiments, and variations and modifications may be made without departing from the scope of the claimed invention.

What is claimed is:

1. An image forming apparatus comprising:
a main housing of said image forming apparatus;
an upper cover rotatably fastened to said main housing, said upper cover having a first position where said upper cover is closed to cover said main housing and a second position where said upper cover is rotated upward by a predetermined opening angle and is thus opened;
a photosensitive drum accommodated in said main housing when said upper cover is held in the first position;
optical image writing means accommodated in said main housing and positioned below said photosensitive drum, for optically writing an image on said photosensitive drum;
image transferring means fastened to said upper cover and positioned above said photosensitive drum when said upper cover is held in said first position, for transferring said image formed on said photosensitive drum to a recording medium;
a drum unit supporting said photosensitive drum;
first means in said upper cover for mechanically and selectively coupling said drum unit and said upper cover;
second means in said drum unit for mechanically and selectively coupling said drum unit and said upper cover; and
third means in said main housing which is mechanically coupled to said second means for driving said second means between a coupling position for coupling said first and second means so that said photosensitive drum supported by said drum unit moves together with said upper cover and a separated position for separating said second means from said first means so that said photosensitive drum is left in said main housing independently of movement of said upper cover;
wherein:
said second means includes a sliding member which is mechanically coupled to said drum unit so as to slide along said drum unit and is driven for said sliding by said third means,
said sliding member has a projection member and has a first stationary position and a second stationary position between which said sliding member slides,
said first means has an arm member having a hole,
said first means provided in said upper cover is coupled to said sliding member in a state where said projection member of said sliding member is inserted into said hole of the arm member of said first means when said sliding member is positioned at said first stationary position by said third means, and
said first means is released from the engagement with said sliding member when said sliding member is positioned at said second stationary position by said third means.

2. An image forming apparatus as claimed in claim 1, wherein said second means includes driving means biasing said sliding member to said first stationary position, and said third means includes lever means engaging with and moving said sliding member against said bias to position said sliding means at said second stationary position.

3. An image forming apparatus as claimed in claim 2, wherein said lever means of said third means includes a lever which is rotatably fastened to said main housing and is mechanically coupled to said sliding member, and wherein said lever partially projects outward from said main housing and is manually rotated in a predetermined direction to position said sliding member at said second stationary position.

4. An image forming apparatus as claimed in claim 1, wherein said drum unit includes a projection and said sliding member includes a sliding guide hole into which said projection of said drum unit is inserted, and wherein said sliding member is guided by said projection and said sliding guide hole so as to slide along said drum unit.

5. An image forming apparatus as claimed in claim 3, wherein said third means includes lock means for locking said lever partially projecting outward from said main housing when said sliding member is positioned at said second stationary position.

6. An image forming apparatus as claimed in claim 1, wherein said drum unit has a side frame along which said sliding member slides.

7. An image forming apparatus as claimed in claim 6, wherein said drum unit has a guide plate along which said recording medium is transported to said photosensitive drum, and said side frame and said guide plate are integrally formed of a resin.

8. An image forming apparatus as claimed in claim 1, wherein said guide unit includes roller means for transporting said recording medium on said photosensitive drum.

9. An image forming apparatus comprising:

a main housing of said image forming apparatus;

an upper cover rotatably fastened to said main housing, said upper cover having a first position where said upper cover is closed to cover said main housing and a second position where said upper cover is rotated upward by a predetermined opening angle and is thus opened;

a photosensitive drum accommodated in said main housing when said upper cover is held in the first position;

optical image writing means accommodated in said main housing and positioned below said photosensitive drum, for optically writing an image on said photosensitive drum;

image transferring means fastened to said upper cover and positioned above said photosensitive drum when said upper cover is held in said first position, for transferring said image formed on said photosensitive drum to a recording medium;

a drum unit supporting said photosensitive drum;

first means in said upper cover for mechanically and selectively coupling said drum unit and said upper cover;

second means in said drum unit for mechanically and selectively coupling said drum unit and said upper cover; and third means in said main housing which is mechanically coupled to said second means for driving said second means between a coupling position for coupling said first and second means so that said photosensitive drum supported by said drum unit moves together with said upper cover and a separated position for separating said second means from said first means so that said photosensitive drum is left in said main housing independently of movement of said upper cover; and further comprising drum covering means interlocking with said drum unit, for covering said photosensitive drum so as to partially enclose the same when said drum unit is located at said second position together with said upper cover.

10. An image forming apparatus comprising:

a main housing of said image forming apparatus;

an upper cover rotatably fastened to said main housing, said upper cover having a first position where said upper cover is closed to cover said main housing and a second position where said upper cover is rotated upward by a predetermined opening angle and is thus opened;

a photosensitive drum accommodated in said main housing when said upper cover is held in the first position;

optical image writing means accommodated in said main housing and positioned below said photosensitive drum, for optically writing an image on said photosensitive drum;

image transferring means fastened to said upper cover and positioned above said photosensitive drum when said upper cover is held in said first position, for transferring said image formed on said photosensitive drum to a recording medium;

a drum unit supporting said photosensitive drum;

first means in said upper cover for mechanically and selectively coupling said drum unit and said upper cover;

second means in said drum unit for mechanically and selectively coupling said drum unit and said upper cover;

third means provided in said main housing and mechanically coupled to said means for driving said second means to selectively couple said first and second means so that said photosensitive drum supported by said drum unit moves together with said upper cover or to separate said second means from said first means so that said photosensitive drum is left in said main housing independently of movement of said upper cover; and a kit holder pivotally fastened to said main housing and accommodating a replaceable kit including a toner cartridge, said kit holder being coupled to an controlled by said third means and having an approximately horizontal position and a maintenance position where said kit holder is rotated upward by a predetermined angle; and further comprising a spring which is fastened to said main housing and gives said kit holder upward force, and said third means includes lock means for locking said kit holder urged upward by said spring at said horizontal position, and wherein when said lock means releases said kit holder from the locked state, said kit holder moves up and is held at said maintenance position.

11. An image forming apparatus as claimed in claim 10, wherein said lock means includes a pin provided on said kit holder and an arm having a hook which engages with said pin when said kit holder is held at said horizontal position.

12. An image forming apparatus comprising:

a main housing of said image forming apparatus;

an upper cover rotatably fastened to said main housing, said upper cover having a first position where said upper cover is closed to cover said main housing and a second position where said upper cover is rotated upward by a predetermined opening angle and is thus opened;

a photosensitive drum accommodated in said main housing when said upper cover is held in the first position;

optical image writing means accommodated in said main housing and positioned below said photosensitive drum, for optically writing an image on said photosensitive drum;

image transferring means fastened to said upper cover and positioned above said photosensitive drum when said upper cover is held in said first position, for transferring said image formed on said photosensitive drum to a recording medium;

a drum unit supporting said photosensitive drum;

first means in said upper cover for mechanically and selectively coupling said drum unit and said upper cover;

second means in said drum unit for mechanically and selectively coupling said drum unit and said upper cover;

third means provided in said main housing and mechanically coupled to said means for driving said second means to selectively couple said first and second means so that said photosensitive drum supported by said drum unit moves together with said upper cover or to separate said second means from said first means so that said photosensitive drum is left in said main housing independently of movement of said upper cover; and a kit holder pivotally fastened to said main housing and accommodating a replaceable kit including a toner cartridge, said kit holder being coupled to an controlled by said third means and having an approximately horizontal position and a maintenance position where said kit holder is rotated upward by a predetermined angle; and wherein said kit holder has a guide hole, and said main housing has a pin which is inserted into said guide hole so as to guide the pivoting movement of said kit holder.

13. An image forming apparatus comprising:

a main housing of said image forming apparatus;

an upper cover rotatably fastened to said main housing, said upper cover having a first position where said upper cover is closed to cover said main housing and a second position where said upper cover is rotated upward by a predetermined opening angle and is thus obtained;

a photosensitive drum accommodated in said main housing when said upper cover is held in the first position;

optical image writing means accommodated in said main housing and positioned below said photosensitive drum, for optically writing an image on said photosensitive drum;

image transferring means fastened to said upper cover and positioned above said photosensitive drum when said upper cover is held in said first position for transferring said image formed on said photosensitive drum to a recording medium;

a drum unit supporting said photosensitive drum;

first means in said upper cover for mechanically and selectively coupling said drum unit and said upper cover;

second means in said drum unit for mechanically and selectively coupling said drum unit and said upper cover;

third means provided in said main housing and mechanically coupled to said means for driving said second means to selectively couple said first and second means so that said photosensitive drum supported by said drum unit moves together with said upper cover or to separate said second means from said first means so that said photosensitive drum is left in said main housing independently of movement of said upper cover; and a kit holder pivotally fastened to said main housing and accommodating a replaceable kit including a toner cartridge, said kit holder being coupled to an controlled by said third means and having an approximately horizontal position and a maintenance position where said kit holder is rotated upward by a predetermined angle; and wherein:

said second means includes a sliding member which is mechanically coupled to said drum unit so as to slide along said drum unit and is driven for said sliding by said third means, said sliding member has a projection member and has a first stationary position and a second stationary position between which said sliding member slides, said first means has an arm member having a hole, said first means provided in said upper cover is coupled to said sliding member in a state where said projection member of said sliding member is inserted into said hole of the arm member of said first means when said sliding member is positioned at said first stationary position by said third means, and said first means is released from the engagement with said sliding member when said sliding member is positioned at said second stationary position by said third means.

14. An image forming apparatus as claimed in claim 13, wherein said second means includes driving means for biasing said sliding member to said first stationary position, and said third means includes lever means engaging with and moving said sliding member against said bias to position said sliding means at said second stationary position and engaging said kit holder to simultaneously position said kit holder at said maintenance position.

15. An image forming apparatus as claimed in claim 14, wherein said lever means of said third means includes a lever which is rotatably fastened to said main housing and is mechanically coupled to said sliding member and said kit holder, and wherein said lever partially projects outward from said main housing and is manually rotated in a predetermined direction to position said sliding member at said second stationary position.

16. An image forming apparatus as claimed in claim 15, further comprising lever locking means in said upper cover manually rotatable for coming into contact with said lever and locking the lever.

17. An image forming apparatus as claimed in claim 16, wherein said lever locking means includes a lock lever in said upper cover, said lock lever having a hook portion which comes into contact with said lever provided in said main housing to prevent said lever from moving when said lever locking means is activated, and said main housing includes a projection which engages with said hook portion of said lock lever when said lever locking means is activated.

18. An image forming apparatus comprising:

a main housing of said image forming apparatus;

an upper cover rotatably fastened to said main housing, said upper cover having a first position where said upper cover is closed to cover said main housing and a second position where said upper cover is rotated upward by a predetermined opening angle and is thus opened;

a photosensitive drum accommodated in said main housing when said upper cover is held in the first position;

optical image writing means accommodated in said main housing and positioned below said photosensitive drum, for optically writing an image on said photosensitive drum;

image transferring means fastened to said upper cover and positioned above said photosensitive drum when said upper cover is held in said first position, for transferring said image formed on said photosensitive drum to a recording medium;

a drum unit supporting said photosensitive drum;

first means in said upper cover for mechanically and selectively coupling said drum unit and said upper cover;

second means in said drum unit for mechanically and selectively coupling said drum unit and said upper cover;

third means provided in said main housing and mechanically coupled to said means for driving said second means to selectively couple said first and second means so that said photosensitive drum supported by said drum unit moves together with said upper cover or to separate said second means from said first means so that said photosensitive drum is left in said main housing independently of movement of said upper cover; and a kit holder pivotally fastened to said main housing and accommodating a replaceable kit including a toner cartridge, said kit holder being coupled to an controlled by said third means and having an approximately horizontal position and a maintenance position where said kit holder is rotated upward by a predetermined angle; and further comprising a holder pressing lever coupled to said upper cover, and a member which is fastened to said kit holder and is kept in contact with said holder pressing lever so as to hold said kit holder at said approximately horizontal position until said kit holder is rotated upward by a predetermined oblique angle which is less than said predetermined opening angle related to said upper cover and less than said predetermined angle related to said kit holder.

* * * * *